(12) United States Patent
Christie et al.

(10) Patent No.: US 11,480,073 B2
(45) Date of Patent: Oct. 25, 2022

(54) GAS TURBINE ENGINE NACELLE AND METHOD OF DESIGNING SAME

(71) Applicant: Rolls-Royce plc, London (GB)

(72) Inventors: Robert E. Christie, London (GB); David G. MacManus, London (GB); Christopher T J Sheaf, London (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 17/518,081

(22) Filed: Nov. 3, 2021

(65) Prior Publication Data
US 2022/0145777 A1 May 12, 2022

(51) Int. Cl.
*F02C 7/04* (2006.01)
*F01D 25/24* (2006.01)
*B64D 29/00* (2006.01)

(52) U.S. Cl.
CPC .......... *F01D 25/24* (2013.01); *B64D 29/00* (2013.01); *F02C 7/04* (2013.01); *F05D 2220/32* (2013.01); *F05D 2250/20* (2013.01); *F05D 2250/51* (2013.01)

(58) Field of Classification Search
CPC . F02C 7/04; F01D 25/24; B64D 29/00; F05D 2220/32; F05D 2250/20; F05D 2250/51
See application file for complete search history.

(56) References Cited

U.S. PATENT DOCUMENTS

| 5,915,403 A | * | 6/1999 | McConachie | F02C 7/04 137/15.1 |
| 2011/0202321 A1 | * | 8/2011 | Lung | F04D 29/544 703/1 |
| 2012/0046782 A1 | * | 2/2012 | Schulze | G05B 19/4093 700/187 |
| 2015/0104306 A1 | * | 4/2015 | Radomski | F01D 25/24 415/213.1 |

(Continued)

FOREIGN PATENT DOCUMENTS

| CN | 106126791 A | 11/2016 | |
| CN | 106414903 A | * 2/2017 | F01D 5/14 |

(Continued)

OTHER PUBLICATIONS

Search Report for Application No. GB2018438.8; dated May 18, 2021; 1 page.

*Primary Examiner* — David E Sosnowski
*Assistant Examiner* — Theodore C Ribadeneyra
(74) *Attorney, Agent, or Firm* — Barnes & Thornburg LLP

(57) ABSTRACT

A system and a method of designing a nacelle for a gas turbine engine having a longitudinal centre line. The nacelle includes an air intake, an internal surface, an azimuthal angle, and a plurality of intake lines. The air intake comprises, in flow series, an intake lip, a throat and a diffuser. The internal surface at least partially defines the air intake. The azimuthal angle is defined about the longitudinal centre line. The intake lines extend along the internal surface of the (Continued)

nacelle at respective values of the azimuthal angle. Each intake line axially defines the air intake along the longitudinal centre line at the respective value of the azimuthal angle. The internal surface of the nacelle between the plurality of intake lines at a given axial location along the longitudinal centre line is analytically defined by an equation.

14 Claims, 8 Drawing Sheets

(56) References Cited

U.S. PATENT DOCUMENTS

| | | | |
|---|---|---|---|
| 2016/0003145 A1* | 1/2016 | Qiu | F01D 25/24 60/726 |
| 2016/0063139 A1* | 3/2016 | Cellier | G06F 30/00 703/1 |
| 2016/0154901 A1* | 6/2016 | Cellier | G06F 30/00 703/1 |
| 2016/0162629 A1* | 6/2016 | Verbrugge | F01D 5/141 703/1 |
| 2019/0130058 A1 | 5/2019 | Thomas | |
| 2020/0088097 A1* | 3/2020 | Bouldin | B64D 33/02 |
| 2021/0123384 A1* | 4/2021 | Gelzer | F01D 21/045 |
| 2021/0189960 A1* | 6/2021 | Speer | F02C 7/042 |

FOREIGN PATENT DOCUMENTS

| | | | | |
|---|---|---|---|---|
| CN | 106677979 A | * | 5/2017 | ........... F03D 1/0633 |
| FR | 3034820 A1 | * | 10/2016 | |
| WO | 2010057627 A1 | | 5/2010 | |
| WO | WO-2016055743 A1 | * | 4/2016 | ............. B64C 11/18 |
| WO | WO-2016055744 A1 | * | 4/2016 | ............. B64C 11/18 |

* cited by examiner

GAS TURBINE ENGINE NACELLE AND METHOD OF DESIGNING SAME

CROSS-REFERENCE TO RELATED APPLICATIONS

This specification is based upon and claims the benefit of priority from United Kingdom patent applications numbers GB 2018438.8 and GB 2102149.8 filed on Nov. 11, 2020 and Feb. 2, 2021, the entire contents of which are incorporated herein by reference.

BACKGROUND

Field of the Disclosure

The present disclosure relates to a gas turbine engine nacelle and a method of designing same.

Description of the Related Art

Intakes of nacelles for gas turbine engines are typically designed using two-dimensional (2D) design lines. These lines are defined in terms of various design parameters, such as aspect ratio, contraction ratio, diffuser angle, curvature distributions, etc. Further, azimuthal positioning and a subsequent lofting process is carried out over the 2D design lines to generate a three-dimensional (3D) surface of the intake. The lofting process typically uses B-splines, or similar techniques to define a geometry of the 3D surface between the 2D design lines.

As the 2D design lines are used to generate a 3D surface of the intake, a complete 3D surface of the intake is not accurately defined using conventional methods. The geometry of the 3D surface of the intake generally depends on the nature and implementation of the lofting process, and is not completely defined independently of the implementation. Therefore, the 3D geometry generated by conventional methods may be inaccurate. Further, the design parameters, such as aspect ratio, contraction ratio, etc., are also not directly used to define the geometry of the 3D surface between the specified 2D design lines. Consequently, the geometry of the 3D surface between the 2D design lines is not defined or controlled using the design parameters. Therefore, it may be difficult and complex to define the geometry without using such design parameters.

SUMMARY OF THE DISCLOSURE

The present disclosure provides a nacelle for a gas turbine engine and a method of designing a nacelle for a gas turbine engine as set out in the appended claims.

According to a first aspect, there is provided a nacelle for a gas turbine engine having a longitudinal centre line. The nacelle includes an air intake, an internal surface, an azimuthal angle, and a plurality of intake lines. The air intake is disposed at an upstream end of the nacelle. The air intake includes, in flow series, an intake lip, a throat and a diffuser. The internal surface at least partially defines the air intake. The azimuthal angle is defined about the longitudinal centre line. The intake lines extend along the internal surface of the nacelle at respective values of the azimuthal angle. Each intake line axially defines the air intake along the longitudinal centre line at the respective value of the azimuthal angle. The internal surface of the nacelle between the plurality of intake lines at a given axial location along the longitudinal centre line is defined by the equation:

$$\xi(\psi)=\Sigma_{i=0}^{n}[bp_i K_{i,n}(\psi^i(1-\psi)^{n-i})]+\psi\Delta\xi,$$

where:
n is a positive integer corresponding to (n+1) number of radial azimuthal constraints,
i is an integer varying from 0 to n, $$\psi = \frac{\phi}{\theta} \text{ and } \xi = \frac{r}{\theta};$$

$\phi$ is the azimuthal angle,
r is a radius of the internal surface of the nacelle relative to the longitudinal centre line at the given axial position,
$\theta$ is a maximum value of the azimuthal angle, such that $0 \leq \phi \leq \theta$ and $0 \leq \psi \leq 1$;
$bp_i$ is an $i^{th}$ Bernstein polynomial coefficient. The Bernstein polynomial coefficients are obtained by solving a set of (n+1) linear equations provided by the radial azimuthal constraints.

$$K_{i,n} = \frac{n!}{i!(n-1)}; \text{ and}$$

$$\Delta\xi = \xi_{\psi=1} - \xi_{\psi=0}.$$

The internal surface of the nacelle at any given axial location along the longitudinal centre line is defined fully and analytically using the above equation. Specifically, a complete three-dimensional (3D) internal surface can be analytically defined as the internal surface between the intake lines by using the above equation and the radial azimuthal constraints. Thus, the internal surface is defined more accurately than conventional lofting processes.

In some embodiments, each intake line at the respective value of the azimuthal angle is defined by the equation:

$$\mu(\lambda)=\Sigma_{i=0}^{m}[cp_i K_{i,m}(\lambda^i(1-\lambda)^{m-i})]\lambda^{1.0}(1-\lambda)^{0.5}+\lambda\Delta\mu,$$

where:
m is a positive integer corresponding to (m+1) number of intake constraints,
i is an integer varying from 0 to m, $$\lambda = \frac{L}{L_{int}} \text{ and } \mu = \frac{x}{L_{int}},$$

$L_{int}$ is an axial length of the air intake relative to the longitudinal centre line,
L is an axial parameter of the intake line, such that $0 \leq L \leq L_{int}$ and $0 \leq \psi \leq 1$,
x is a radius of the internal surface of the nacelle relative to the longitudinal centre line,
$cp_i$ is an $i^{th}$ Bernstein polynomial coefficient. The Bernstein polynomial coefficients are obtained by solving a set of (m+1) linear equations provided by the intake constraints.

$$K_{i,n} = \frac{m!}{i!(m-1)}, \text{ and}$$

$$\Delta\mu = \mu_{\lambda=1} - \mu_{\lambda=0}.$$

In some embodiments, the intake constraints for each intake line includes at least one positional constraint, at least one gradient constraint, at least one second derivative constraint and at least one radius of curvature constraint.

In some embodiments, the radial azimuthal constraints include at least one positional constraint, at least one gradient constraint, at least one second derivative constraint and at least one radius of curvature constraint.

In some embodiments, an azimuthal variation of a parameter of the nacelle at a given axial position along the longitudinal centre line is defined by the equation:

$$\omega(\psi) = \Sigma_{i=0}^{p}[dp_i K_{i,p}(\psi^i(1-\psi)^{p-i})] + \psi\Delta\omega,$$

where:
p is a positive integer corresponding to (p+1) number of parameter azimuthal constraints,
i is an integer varying from 0 to p, $$\psi = \frac{\phi}{\theta} \text{ and } \omega = \frac{y}{\theta},$$

$\phi$ is the azimuthal angle,
$\theta$ is a maximum value of the azimuthal angle, such that $0 \leq \phi \leq \theta$ and $0 \leq \psi \leq 1$,
y is the parameter of the nacelle,
$dp_i$ is an $i^{th}$ Bernstein polynomial coefficient. The Bernstein polynomial coefficients are obtained by solving a set of (p+1) linear equations provided by the azimuthal constraints.

$$K_{i,p} = \frac{p!}{i!(p-1)}, \text{ and}$$

$$\Delta\omega = \omega_{\psi=1} - \omega_{\psi=0}.$$

In some embodiments, the intake lip includes a highlight at a leading edge of the nacelle. The highlight includes a highlight radius. The throat includes a throat radius. A contraction ratio is defined as a ratio between the highlight radius and the throat radius. The contraction ratio is the parameter of the nacelle.

In some embodiments, the intake lip further includes a lip length between the leading edge of the nacelle and the throat. An aspect ratio is defined as a ratio of the lip length, and a difference between the highlight radius and the throat radius. The aspect ratio is the parameter of the nacelle.

In some embodiments, the intake lip further includes a lip radius at the highlight of the nacelle. A lip factor is defined as a ratio between a product of the lip radius and the lip length, and a square of a difference between the highlight radius and the throat radius. The lip factor is the parameter of the nacelle.

The use of design parameters, such as the contraction ratio, the aspect ratio, and the lip factor, for defining the nacelle may simplify the design process of the nacelle.

According to a second aspect, there is provided a gas turbine engine for an aircraft. The gas turbine engine includes the nacelle of the first aspect.

According to a third aspect, there is provided a method of designing a nacelle for a gas turbine engine having a longitudinal centre line. The nacelle includes an air intake. The method includes determining a plurality of intake lines extending along an internal surface of the nacelle at respective values of an azimuthal angle. The azimuthal angle is defined about the longitudinal centre line. Each intake line axially defines the air intake along the longitudinal centre line at the respective value of the azimuthal angle. The method further includes determining the internal surface between the plurality of intake lines at a given axial location along the longitudinal centre line by the equation:

$$\xi(\psi) = \Sigma_{i=0}^{n}[bp_i K_{i,n}(\psi^i(1-\psi)^{n-i})] + \psi\Delta\xi,$$

where:
n is a positive integer corresponding to (n+1) number of radial azimuthal constraints,
i is an integer varying from 0 to n, $$\psi = \frac{\phi}{\theta} \text{ and } \xi = \frac{r}{\theta};$$

$\phi$ is the azimuthal angle,
r is a radius of the internal surface of the nacelle relative to the longitudinal centre line,
$\theta$ is a maximum value of the azimuthal angle, such that $0 \leq \phi \leq \theta$ and $0 \leq \psi \leq 1$,
$bp_i$ is an $i^{th}$ Bernstein polynomial coefficient. The Bernstein polynomial coefficients are obtained by solving a set of (n+1) linear equations provided by the radial azimuthal constraints.

$$K_{i,n} = \frac{n!}{i!(n-1)}, \text{ and}$$

$$\Delta\xi = \xi_{\psi=1} - \xi_{\psi=0}.$$

In some embodiments, each intake line at the respective value of the azimuthal angle is determined by the equation:

$$\mu(\lambda) = \Sigma_{i=0}^{m}[cp_i K_{i,m}(\lambda^i(1-\lambda)^{m-i})]\lambda^{1.0}(1-\lambda)^{0.5} + \lambda\Delta\mu,$$

where:
m is a positive integer corresponding to (m+1) number of intake constraints,
i is an integer varying from 0 to m, $$\lambda = \frac{L}{L_{inf}} \text{ and } \mu = \frac{x}{L_{inf}},$$

$L_{int}$ is an axial length of the air intake relative to the longitudinal centre line,
L is an axial parameter of the intake line, such that $0 \leq L \leq L_{int}$ and $0 \leq \psi \leq 1$,
x is a radius of the internal surface of the nacelle relative to the longitudinal centre line,
$cp_i$ is an $i^{th}$ Bernstein polynomial coefficient. The Bernstein polynomial coefficients are obtained by solving a set of (m+1) linear equations provided by the intake constraints.

$$K_{i,m} = \frac{m!}{i!(m-1)}, \text{ and}$$

$$\Delta\mu = \mu_{\lambda=1} - \mu_{\lambda=0}.$$

In some embodiments, the intake constraints for each intake line includes at least one positional constraint, at least one gradient constraint, at least one second derivative constraint and at least one radius of curvature constraint.

In some embodiments, the radial azimuthal constraints include at least one positional constraint, at least one gradient constraint, at least one second derivative constraint and at least one radius of curvature constraint.

In some embodiments, the method further includes determining an azimuthal variation of a parameter of the nacelle at a given axial position along the longitudinal centre line by the equation:

$$\omega(\psi) = \Sigma_{i=0}^{p}[dp_i K_{i,p}(\psi^i(1-\psi)^{p-i})] + \psi\Delta\omega,$$

where:
p is a positive integer corresponding to (p+1) number of parameter azimuthal constraints,
i is an integer varying from 0 to p, $$\psi = \frac{\phi}{\theta} \text{ and } \omega = \frac{y}{\theta};$$

φ is the azimuthal angle,
θ is a maximum value of the azimuthal angle, such that $0 \leq \phi \leq \theta$ and $0 \leq \psi \leq 1$,
y is the parameter of the nacelle,
$dp_i$ is an $i^{th}$ Bernstein polynomial coefficient. The Bernstein polynomial coefficients are obtained by solving a set of (p+1) linear equations provided by the azimuthal constraints.

$$K_{i,p} = \frac{p!}{i!(p-1)}, \text{ and}$$

$$\Delta\omega = \omega_{\psi=1} - \omega_{\psi=0}.$$

As noted elsewhere herein, the present disclosure may relate to a gas turbine engine. Such a gas turbine engine may comprise a core engine comprising a turbine, a combustor, a compressor, and a core shaft connecting the turbine to the compressor. Such a gas turbine engine may comprise a fan (having fan blades) located upstream of the core engine.

According to an aspect, there is provided an aircraft comprising a gas turbine engine as described and/or claimed herein. The aircraft according to this aspect is the aircraft for which the gas turbine engine has been designed to be attached.

According to an aspect, there is provided a method of operating a gas turbine engine as described and/or claimed herein.

According to an aspect, there is provided a method of operating an aircraft comprising a gas turbine engine as described and/or claimed herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
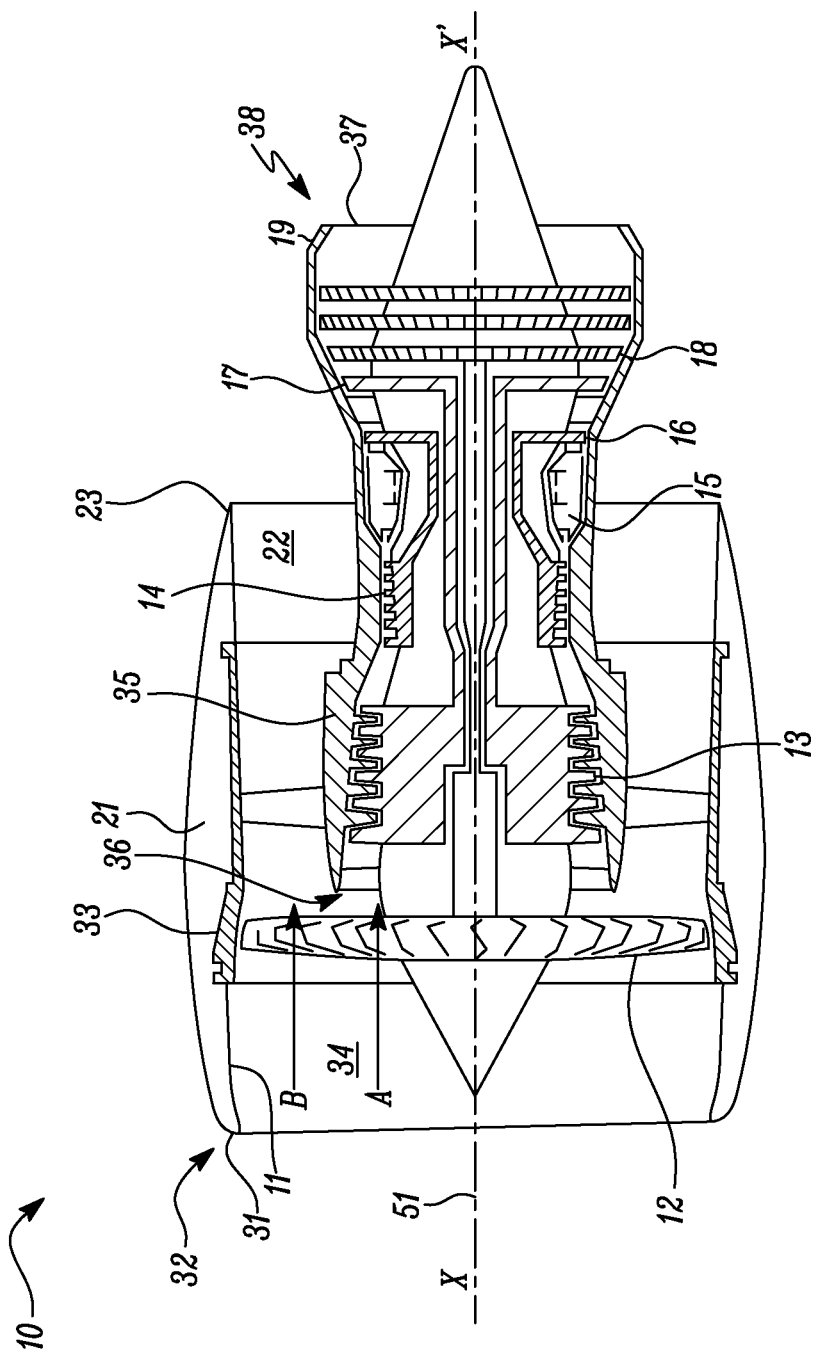
FIG. 1 is a sectional side view of a gas turbine engine.

FIG. 1 shows a ducted gas turbine engine 10 having a principal rotational axis X-X'. The gas turbine engine 10 includes, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive the high, intermediate and low pressure turbines 16, 17, 18 before being exhausted through the core engine exhaust nozzle 19 to provide additional propulsive thrust. The high, intermediate and low pressure turbines 16, 17, 18 respectively drive the high and intermediate pressure compressors 14, 13 and the fan 12 by suitable interconnecting shafts.

In some embodiments, the gas turbine engine 10 is used in an aircraft. In some embodiments, the gas turbine engine 10 is an ultra-high bypass ratio engine (UHBPR).

The nacelle 21 further includes an intake lip 31 disposed at an upstream end 32 of the nacelle 21, a fan casing 33 downstream of the intake lip 31, a diffuser 34 disposed between the upstream end 32 and the fan casing 33, and an engine casing 35 downstream of the intake lip 31. The fan 12 is received within the fan casing 33. A core engine 36 of the gas turbine engine 10 including the intermediate pressure compressor 13, the high pressure compressor 14, the combustion equipment 15, the high pressure turbine 16, the intermediate pressure turbine 17, the low pressure turbine 18 and the core engine exhaust nozzle 19 is at least partially received within the nacelle 21. Specifically, the core engine 36 is received within the engine casing 35. The nacelle 21 further includes an exhaust 37 disposed at a downstream end 38 of the nacelle 21. The exhaust 37 may be part of the engine casing 35. The exhaust 37 may at least partly define the core engine exhaust nozzle 19.

The nacelle 21 for the gas turbine engine 10 may be typically designed by manipulating a plurality of design variables. The selection of the design variables may be dependent on a cruise Mach speed of an aircraft the nacelle 21 is attached to, as well as considerations for integration of engine ancillaries, such as a thrust reversal unit (TRU). Optimisation of these variables may be required to minimise the cruise drag incurred due to size and design of the nacelle 21.

The geometry of the gas turbine engine 10, and components thereof, is defined by a conventional axis system, comprising an axial direction (which is aligned with the rotational axis X-X'), a radial direction (in the bottom-to-top direction in FIG. 1), and a circumferential direction (perpendicular to the page in the FIG. 1 view). The axial, radial and circumferential directions are mutually perpendicular.

In addition, the present invention is equally applicable to aero gas turbine engines, marine gas turbine engines and land-based gas turbine engines.

Figure 2:
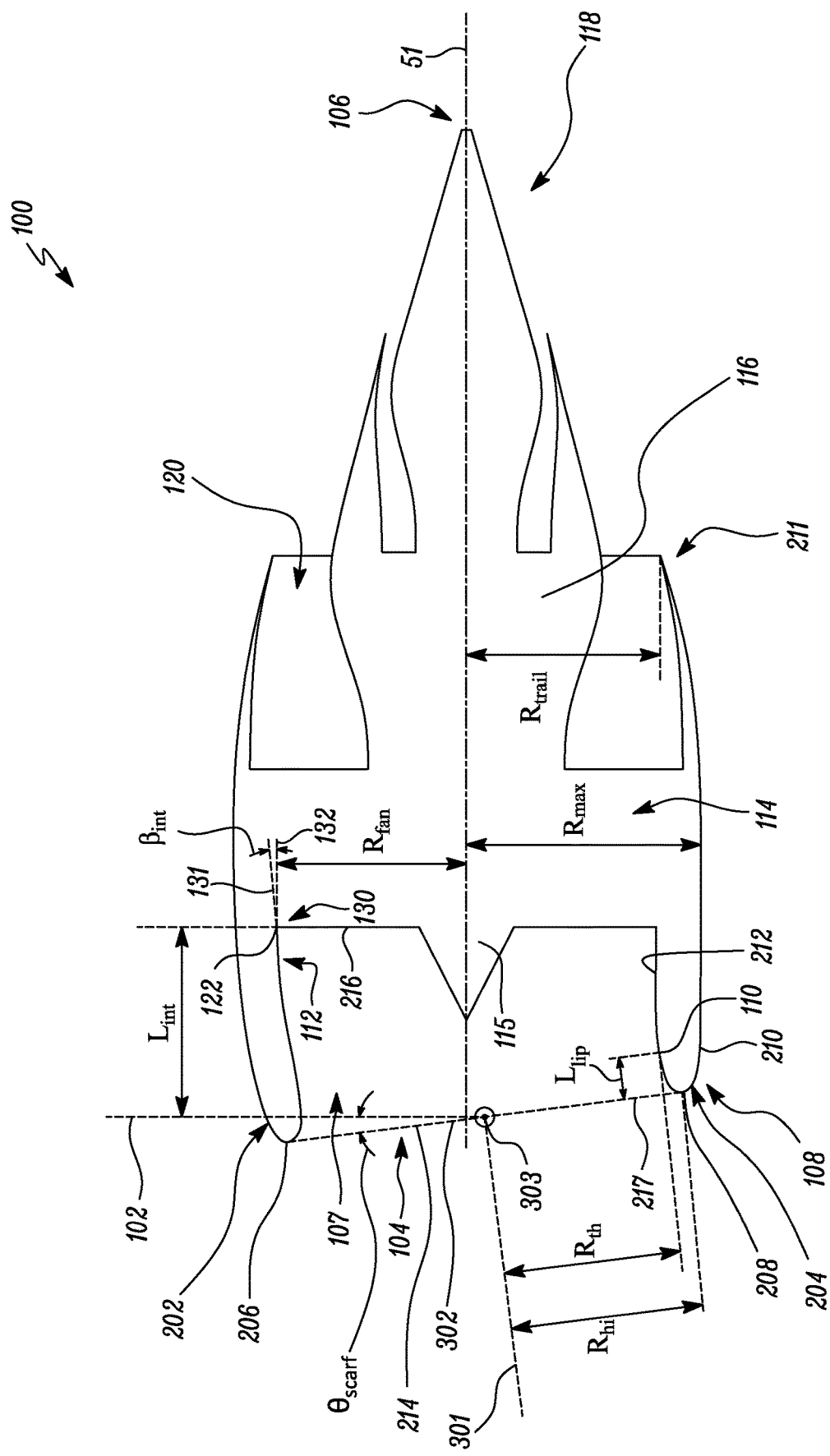
FIG. 2 is a schematic sectional side view of a nacelle of the gas turbine engine.

FIG. 2 illustrates a nacelle 100 for the gas turbine engine 10 (shown in FIG. 1) having the longitudinal centre line 51, in accordance with an embodiment of the present disclosure. The nacelle 100 may be formed using any suitable material. For example, the nacelle 100 may formed as a metal forging, with the metal being selected from the group comprising steel, titanium, aluminium and alloys thereof. Optionally, the nacelle 100 may be formed from a fibre reinforced composite material, with the composite fibre being selected from the group comprising glass, carbon, boron, aramid, and combinations thereof. An advantage of using a fibre reinforced composite material to form the nacelle 100 is that its weight may be reduced over a nacelle formed from a metallic material.

As shown in FIG. 1, the longitudinal centre line 51 coincides with the principal rotational axis X-X' of the gas turbine engine 10. As shown in FIG. 2, the nacelle 100 further defines a reference line 102 perpendicular to the longitudinal centre line 51. The longitudinal centre line 51 is also illustrated in FIG. 2.

Referring to FIG. 2, the nacelle 100 generally has a tubular structure including an upstream end 104 and a downstream end 106 opposite to the upstream end 104. The nacelle 100 includes an air intake 107 disposed at the upstream end 104 of the nacelle 100. The air intake 107 of the nacelle 100 includes, in flow series, an intake lip 108, a throat 110 and a diffuser 112. The intake lip 108 is disposed at the upstream end 104 of the nacelle 100. The throat 110 is positioned adjacent to the intake lip 108 in the direction of air flow along the longitudinal centre line 51. The nacelle 100 further includes a fan section 114. The fan 12 (shown in FIG. 1) is received within the fan section 114. The fan section 114 further includes a fan hub 115. Fan blades 310 (shown in FIG. 3A) extend radially outwardly from the fan hub 115 to respective blade tips 312. The fan section 114 is disposed downstream of and adjacent to the diffuser 112. The diffuser 112 is disposed between the upstream end 104 and the fan section 114. The nacelle 100 further includes an engine casing 116 disposed downstream of the fan section 114. The engine core 36 (shown in FIG. 1) is at least partially received within the engine casing 116. The engine casing 116 surrounds the engine core 36. The nacelle 100 further incudes an exhaust 118 disposed at the downstream end 106 of the nacelle 100. In some embodiments, the nacelle 100 may be used in the gas turbine engine 10 (shown in FIG. 1) in an aircraft.

The nacelle 100 is generally terminated by the exhaust 118 whose outlet is located downstream of the engine casing 116. The exhaust 118 may exhaust the resultant hot combustion products from the combustion equipment 15 (shown in FIG. 1) of the gas turbine engine 10. The nacelle 100 may further include a cowling disposed proximal to the downstream end 106. The cowling may be able to accommodate ancillaries, such as a TRU. The TRU may be any type, for example, target type, clam-shell type, or cold stream type. The nacelle 100 further includes a bypass nozzle 120 disposed proximal to the downstream end 106. The bypass nozzle 120 may exhaust the bypass air from the fan 12 (shown in FIG. 1).

The intake lip 108, the throat 110 and the diffuser 112 form the air intake 107 to supply air to the fan 12 (see FIG. 1) of the gas turbine engine 10 during operation of the gas turbine engine 10. The air intake 107 may be further required to absorb noise generated by the gas turbine engine. The diffuser 112 may be sized and configured for reducing velocity of the airflow while increasing its static pressure.

In the illustrated embodiment, the intake lip 108 is scarfed with a positive scarf angle. However, in some other embodiments, the intake lip 108 may have zero or negative scarf. In some embodiments, the nacelle 100 may be drooped. In such cases, a droop angle (not shown) may be defined between a normal to a fan section leading edge 216 and the longitudinal centre line 51. Some advantages of drooping may include improved low speed high incidence angle of attack performance. The fan section leading edge 216 may also correspond to a trailing edge of the air intake 107. The fan section leading edge 216 may also be interchangeably referred to as "the air intake trailing edge 216".

The intake lip 108 includes a crown 202 and a keel 204. The intake lip 108 includes a top portion and a bottom portion defining the crown 202 and the keel 204, respectively. The crown 202 includes a crown leading edge 206 at an extreme upstream edge of the crown 202. Similarly, the keel 204 includes a keel leading edge 208 at an extreme upstream end of the keel 204. The crown 202 and the keel 204 are spaced circumferentially apart by about 180 degrees relative to the longitudinal centre line 51. In the illustrated embodiment of FIG. 2, the crown leading edge 206 is axially forward of the keel leading edge 208 relative to the longitudinal centre line 51. However, in alternative embodiments, the keel leading edge 208 may be axially forward of the crown leading edge 206 relative to the longitudinal centre line 51.

The nacelle 100 further includes an outer surface 210, an internal surface 212 and a highlight 214. Each of the internal surface 212 and the outer surface 210 may be generally annular. The highlight 214 may form a boundary between the outer surface 210 and the internal surface 212 at the intake lip 108. The highlight 214 may define an annular upstream edge of the nacelle 100. Specifically, the highlight 214 may define the upstream edge of the intake lip 108. The throat 110 and the diffuser 112 are defined by the internal surface 212 of the nacelle 100. In the illustrated embodiment, the internal surface 212 at least partially defines the air intake 107. The outer surface 210 may define a trailing edge 211 of the nacelle. The trailing edge 211 defines a trailing edge radius $R_{trail}$ of the nacelle.

The highlight 214 may define a leading edge 217 of the nacelle 100. The leading edge 217 may be a continuous edge of the nacelle 100 disposed at the upstream end 104. The leading edge 217 may be an annular leading edge having a circumferential extent of 360 degrees around the longitudinal centre line 51. Therefore, the highlight 214 may also be annular as the highlight 214 corresponds to the leading edge 217 of the nacelle 100. The highlight 214 includes the crown leading edge 206 and the keel leading edge 208.

The crown leading edge 206 and the keel leading edge 208 define a scarf line 302 therebetween. Specifically, the scarf line 302 is a straight line that joins the crown leading edge 206 and the keel leading edge 208. The scarf line 302 forms a scarf angle $\theta_{scarf}$ relative to the reference line 102 perpendicular to the longitudinal centre line 51. The scarf angle $\theta_{scarf}$ is indicative of an axial offset between the crown ° scarf leading edge 206 and the keel leading edge 208 relative to the longitudinal centre line 51. A positive value of the scarf angle $\theta_{scarf}$ may correspond to the crown leading edge 206 being axially forward of the keel leading edge 208. On the other hand, a negative value of the scarf angle $\theta_{scarf}$ may correspond to the keel leading edge being axially forward of the crown leading edge 206.

Some advantages of scarfing may include noise reduction, improved foreign object damage resistance, and improved keel high incidence angle of attack performance.

The scarf line 302 further defines a midpoint 303 between the crown leading edge 206 and the keel leading edge 208. An intake construction line 301 is defined normal to the scarf line 302 and passing through the midpoint 303. The highlight 214 further defines a highlight radius $R_{hi}$ of the nacelle 100. The highlight radius $R_{hi}$ may be defined as the radius of the highlight 214 measured along the scarf line 302. In some embodiments, the highlight radius $R_{hi}$ is defined as a distance between the midpoint 303 of the scarf line 302 and one of the crown 202 and the keel 204 measured along the scarf line 302. Specifically, the highlight radius $R_{hi}$ is measured along the scarf line 302 between the midpoint 303 and the crown leading edge 206 or the keel leading edge 208. In some embodiments, the highlight radius $R_{hi}$ is defined as a distance between the intake construction line 301 and one of the crown 202 and the keel 204 measured along the scarf line 302.

The internal surface 212 and the outer surface 210 may define a radius of curvature of the intake lip 108. In some embodiments, the nacelle 100 may include one or more acoustic liners (not shown) provided on the internal surface 212 of the intake lip 108. The intake lip 108 further includes a lip length $L_{lip}$ between the leading edge 217 of the nacelle 100 and the throat 110. In other words, the lip length $L_{lip}$ is defined between the highlight 214 and the throat 110.

The throat 110 is disposed at an interface between the intake lip 108 and the diffuser 112. The throat 110 extends radially by a throat radius $R_{th}$ with respect to the longitudinal centre line 51. The throat radius $R_{th}$ may be defined as the radius of the throat 110 measured along the scarf line 302. In some embodiments, the throat radius $R_{th}$ is defined as the distance between the throat 110 and the midpoint 303 measured along the scarf line 302. In some embodiments, the throat radius $R_{th}$ is defined as a distance between the intake construction line 301 and the throat 110 measured parallel to the scarf line 302. The throat radius $R_{th}$ is less than the highlight radius $R_{hi}$. The nacelle 100 extends radially by a maximum radius $R_{max}$. The maximum radius $R_{max}$ is defined by the outer surface 210 of the nacelle 100 at the fan section 114. The fan section 114 extends radially by a fan radius $R_{fan}$ with respect to the longitudinal centre line 51.

The air intake 107 extends axially by an axial length $L_{int}$ (or may be referred as intake length) with respect to the longitudinal centre line 51. In some embodiments, the axial length $L_{int}$ of the air intake 107 is defined as an axial distance between the midpoint 303 of the scarf line 302 and a downstream end 122 of the diffuser 112. Specifically, the axial length $L_{int}$ is measured along the longitudinal centre line 51 between the midpoint 303 of the scarf line 302 and the downstream end 122 of the diffuser 112.

The fan section 114 is disposed downstream of the intake lip 108. The fan section 114 includes the fan section leading edge 216. The fan section leading edge 216 may be an upstream edge of the fan section 114 facing the intake lip 108. The fan section leading edge 216 may extend radially from the fan hub 115 towards the internal surface 212 of the nacelle 100. The fan section leading edge 216 and the downstream end 122 of the diffuser 112 may be at generally the same axial location relative to the longitudinal centre line 51. The downstream end 122 of the diffuser 112 may be formed at a point of intersection between the fan section leading edge 216 and the diffuser 112.

The air intake 107 further includes a boat tail 130 which is a slightly curved base at the downstream end 122 of the diffuser 112. Further, a line 131 extends radially and axially away from the downstream end 122 of the diffuser 112, following a geometry of the boat tail 130. The line 131 forms an angle $\beta_{int}$ relative to a reference line 132 parallel to the longitudinal centre line 51. In some embodiments, the angle $\beta_{int}$ may be defined as an angle of divergence of the internal surface 212 of the air intake 107 relative to the longitudinal centre line 51

Figure 3B:
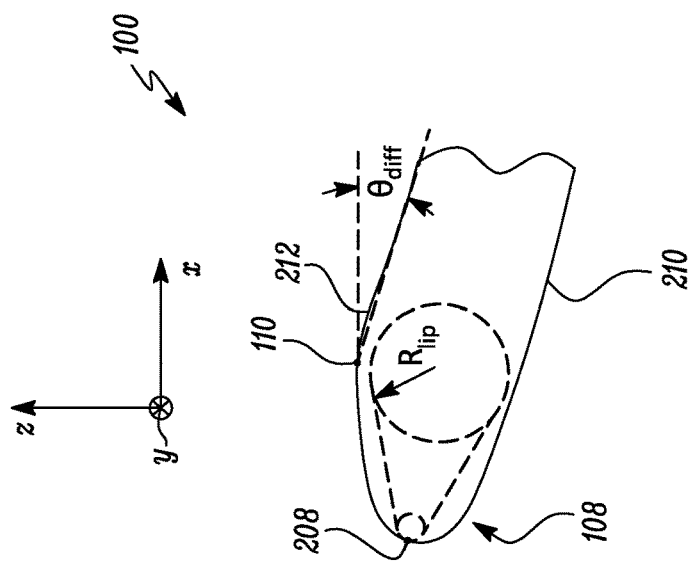
FIGS. 3A and 3B are partial sectional side views of the nacelle of FIG. 2.
Figure 3A:
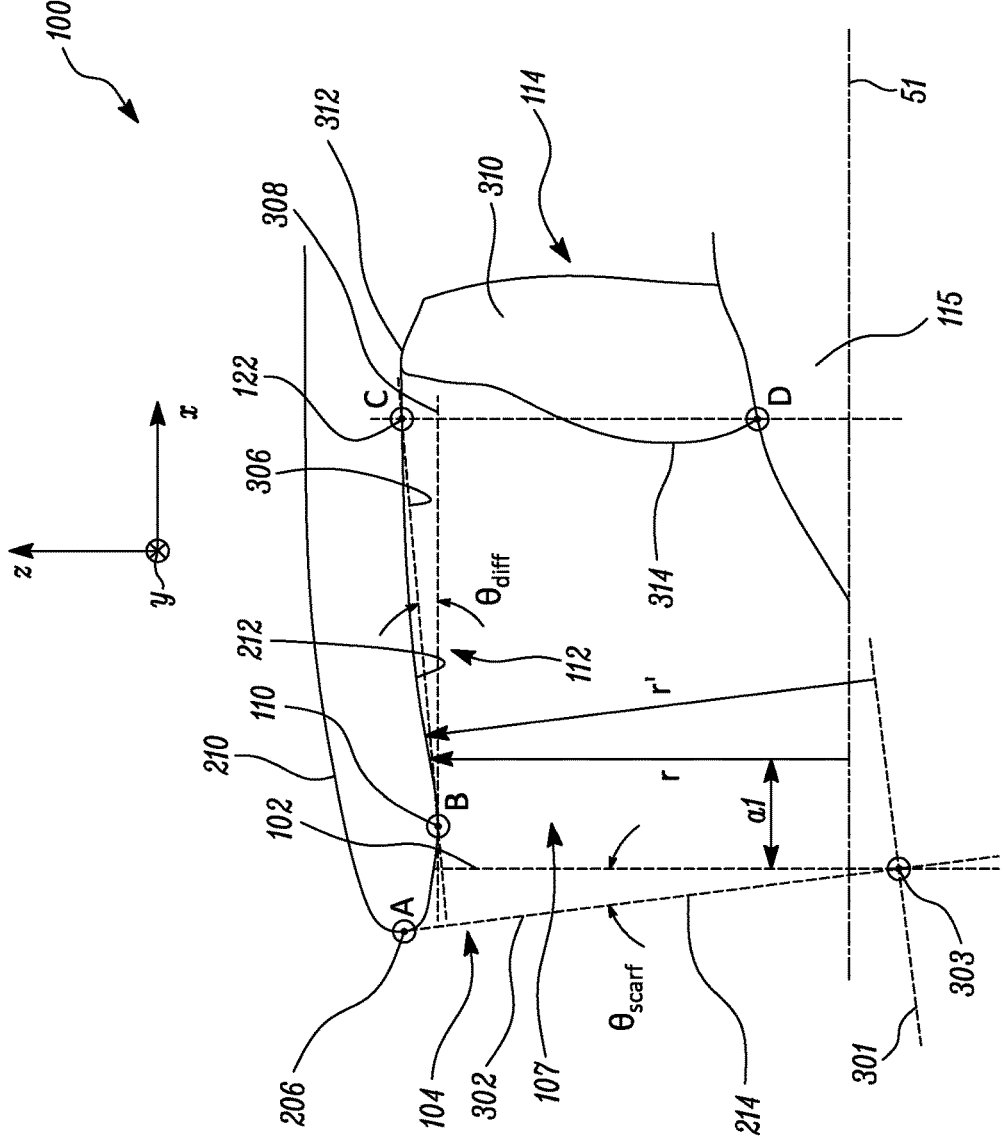

FIGS. 3A and 3B illustrate partial sectional side views of the nacelle 100. FIG. 3A illustrates a top portion of the nacelle 100. FIG. 3B illustrates a lower portion of the nacelle 100. The nacelle 100 includes the air intake 107 extending along x-axis that is parallel to the longitudinal centre line 51 of the gas turbine engine 10 (shown in FIG. 1). The air intake 107 includes the scarf angle $\theta_{scarf}$. In the illustrated embodiment, the scarf angle $\theta_{scarf}$ is positive, i.e., the crown leading edge 206 is axially forward of the keel leading edge 208 (shown in FIG. 2). A point A on the nacelle 100 is a point of intersection of the scarf line 302 with the highlight 214. The point A denotes the crown leading edge 206.

A point B is disposed downstream of the point A. The point B denotes the throat 110 of the nacelle 100. A point C is disposed further downstream of the point B. The point C denotes the downstream end 122 of the diffuser 112. A line connecting the point B to the point C is defined as a diffuser line 306. Therefore, the diffuser line 306 is defined between the throat 110 and the downstream end 122 of the diffuser 112. A point D is a point of intersection of a leading edge 314 of the fan blade 310 and the fan hub 115. The point D denotes a fan hub leading edge. The points C and D are at equal axial positions with respect to the longitudinal centre line 51. In other words, the point C is the point on the air intake 107 that is at an equal axial position as the point D (i.e., the fan hub leading edge).

A line 308 parallel to the longitudinal centre line 51 passes through the point B. A diffuser angle $\theta$ of the diffuser 112 is formed between the diffuser line 306 and the line 308. Specifically, the diffuser angle $\theta_{diff}$ is defined as an angle between the diffuser line 306 and the longitudinal centre line 51. Therefore, the diffuser angle $\theta_{diff}$ may be indicative of an inclination of the diffuser 112 with respect to the longitudinal centre line 51. In other words, the diffuser angle $\theta_{diff}$ is indicative of a degree of divergence of the diffuser 112 relative to the longitudinal centre line 51.

Some of the advantages of diffusing may include local flow acceleration and radiation of sounds in a reduced manner in or adjacent to a local area.

FIG. 3B illustrates the intake lip 108. The intake lip 108 extends between the inner surface 212 and the outer surface 210 of the nacelle 100. The intake lip 108 further includes a lip radius $R_{lip}$. The lip radius $R_{lip}$ may be defined as the radius of curvature of the intake lip 108. FIG. 3B shows the lip radius $R_{lip}$ at the keel leading edge 208 of the nacelle 100. However, the lip radius $R_{lip}$ may be defined along the whole annular extent of the intake lip 108 (i.e., 360 degrees). The throat 110 and the diffuser angle $\theta_{diff}$ are also shown in FIG. 3B.

Figure 4:
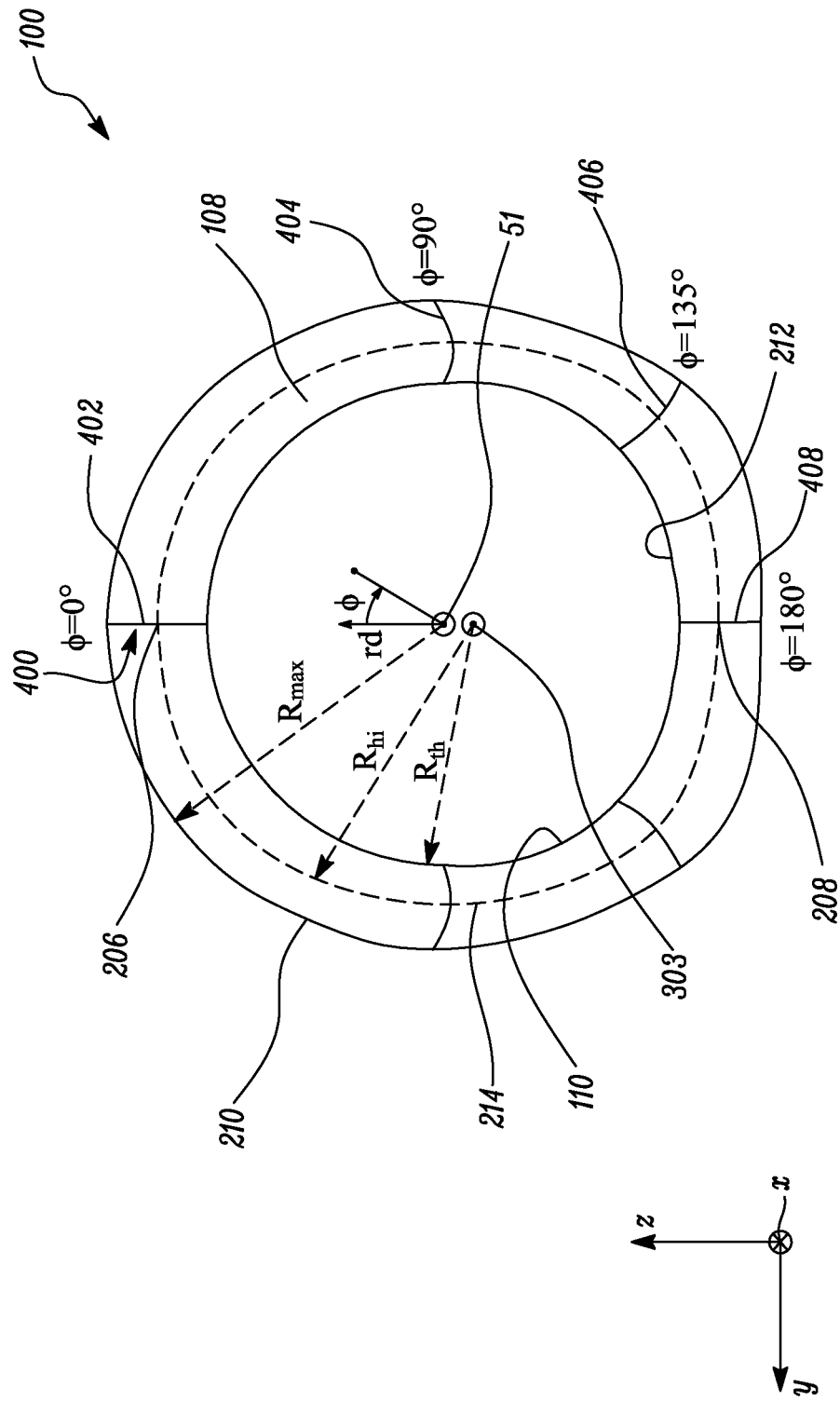
FIG. 4 is a schematic front view of the nacelle of FIG. 2.

FIG. 4 is a front view of the nacelle 100. The nacelle 100 includes an azimuthal angle φ defined about the longitudinal centre line 51. The nacelle 100 further defines a radial direction rd relative to the longitudinal centre line 51. The radial direction rd is shown in a radially outer direction. Further, the azimuthal angle φ is shown in a clockwise direction. The azimuthal angle φ denotes a circumferential direction about the longitudinal centre line 51. The nacelle 100 further defines three mutually orthogonal axes x, y, and z. The x-axis is generally parallel to the longitudinal centre line 51. The y-axis is defined along a generally horizontal direction perpendicular to the longitudinal centre line, while the z-axis is defined along a generally vertical direction.

FIG. 4 illustrates the throat radius $R_{th}$, the highlight radius $R_{hi}$, and the maximum radius $R_{max}$. The maximum radius $R_{max}$ is defined at the outer surface 210 of the nacelle 100. The nacelle 100 further defines a plurality of intake lines 400 at different values of the azimuthal angle φ. The intake lines 400 may be axial lines extending along the longitudinal centre line 51. For example, the nacelle 100 defines a top intake line 402 at φ=0 degree, a side intake line 404 at φ=90 degrees, a control intake line 406 at φ=135 degrees and a bottom intake line 408 at φ=180 degrees. The lines 402, 404, 406 and 408 are collectively referred to as the intake lines 400. The different intake lines 400 may be used to define the air intake 107. The throat radius $R_{th}$, the highlight radius $R_{hi}$, and the maximum radius $R_{max}$ vary azimuthally. Specifically, the throat radius $R_{th}$, the highlight radius $R_{hi}$, and the maximum radius $R_{max}$ may be a function of the azimuthal angle φ. The nacelle 100 may have an axial plane of symmetry oriented along φ=0 degree and φ=180 degrees. In some embodiments, the azimuthal angle φ has a maximum value θ (e.g., 180 degrees) depending on a plane of symmetry of the nacelle 100. In some embodiments, a minimum value of the azimuthal angle φ is 0 degree. A value of the azimuthal angle φ may therefore vary between 0 and θ (0≤φ≤θ).

A point of intersection of the highlight 214 with the top intake line 402 denotes the crown leading edge 206 of the nacelle 100. Similarly, a point of intersection of the highlight 214 with the bottom intake line 408 denotes the keel leading edge 208 of the nacelle 100. The intake lip 108 is at least partly defined between the highlight 214 and the throat 110.

Referring to FIGS. 2, 3A, 3B, and 4, the air intake 107 includes the intake lip 108. The intake lip 108 includes the highlight 214 at the leading edge 217 of the nacelle 100. The highlight 214 includes the highlight radius $R_{hi}$ and the throat 110 includes the throat radius $R_{th}$. The intake lip 108 further includes the lip length $L_{lip}$ between the leading edge 217 of the nacelle 100 and the throat 110. The intake lip 108 further includes the lip radius $R_{lip}$ at the highlight 214 of the nacelle 100.

In some embodiments, a contraction ratio CR is defined as a ratio between the highlight radius $R_{hi}$ and the throat radius $R_{th}$, in accordance with Equation 1 provided below.

$$CR = \frac{R_{hi}}{R_{th}} \quad \text{[Equation 1]}$$

Further, an aspect ratio AR is defined as a ratio of the lip length $L_{lip}$, and a difference between the highlight radius $R_{hi}$ and the throat radius $R_{th}$, in accordance with Equation 2 provided below.

$$AR = \frac{L_{lip}}{R_{hi} - R_{th}} \quad \text{[Equation 2]}$$

Further, a lip factor $F_{lip}$ is defined as a ratio between a product of the lip radius $R_{lip}$ and the lip length $L_{Lip}$, and a square of a difference between the highlight radius $R_{hi}$ and the throat radius $R_{th}$, in accordance with Equation 3 provided below.

$$F_{lip} = R_{lip} \frac{L_{lip}}{(R_{hi} - R_{th})^2} \quad \text{[Equation 3]}$$

The nacelle 100 includes the internal surface 212 at least partially defining the air intake 107. In the illustrated embodiment, the nacelle 100 further includes the plurality of intake lines 400 extending along the internal surface 212 of the nacelle 100 at respective values of the azimuthal angle φ. Each intake line 400 axially defines the air intake 107 along the longitudinal centre line 51 at the respective value of the azimuthal angle φ. Further, each intake line 400 at the respective value of the azimuthal angle φ is defined by a Bernstein polynomial using intuitive class shape transformation (iCST) approach. Each intake line 400 at the respective value of the azimuthal angle φ is defined by Equation 4 provided below.

$$\mu(\lambda) = \Sigma_{i=0}^{m}[cp_i K_{i,m}(\lambda^i(1-\lambda)^{m-i})]\lambda^{1.0}(1-\lambda)^{0.5} + \lambda\Delta\mu \quad \text{[Equation 4]}$$

where μ and λ are two non-dimensional parameters.

The Bernstein polynomial in Equation 4 is defined as a sum of the term $\lambda\Delta\mu$ and a product of a class function C(λ) and a shape function S(λ). The iCST approach is a transformation of the class shape transformation (CST) parameterisation method to a full set of intuitive parameters by a transformation matrix. The iCST approach analytically calculates the transformation matrix for a set of arbitrary constraints. A basic profile of the nacelle 100 may be defined by the class function C(λ). The class function C(λ) which describes basic external aerodynamic shapes through different exponent combinations is defined by Equation 5 provided below.

$$C(\lambda) = \lambda^{1.0}[1-\lambda]^{0.5} \quad \text{[Equation 5]}$$

Values of the non-dimensional parameter λ varies from zero to one (0≤λ≤1). Equation 5 may be used to describe bi-convex, elliptic, and round-nosed aerofoil shapes as well as other common external aerodynamic shapes, such as a Sears-Haack body or a cone. In Equation 4, Equation 5 is employed as the class function. Further, the class function C(λ) is modified by the shape function S(λ). The shape functions S(λ) is defined by Equation 6 provided below.

$$S(\lambda) = \Sigma_{i=0}^{m}[cp_i K_{i,m}(\lambda^i(1-\lambda)^{m-i})] \quad \text{[Equation 6]}$$

The shape function S(λ) may be manipulated by the variation of Bernstein polynomial coefficients $cp_i$ which in turn modifies the final profile. The mathematically smooth behaviour of the shape functions S(λ) and their inherent curvature continuity make the iCST approach ideal for aerodynamic optimization work. However, the approach relies on the manipulation of the Bernstein polynomial coefficients $cp_i$ which are not aerodynamically intuitive. To allow a design engineer to explore the design space and set up constraints for optimization process, the parameters need to be physically or aerodynamically intuitive.

Referring now to Equation 4, m is a positive integer corresponding to (m+1) number of intake constraints C and i is an integer whose value varies from 0 to m (0≤i≤m). The intake constraints C for each intake line 400 may include at least one positional constraint, at least one gradient constraint, at least one second derivative constraint and at least one radius of curvature constraint. (m+1) number of the intake constraints C further defined as C.0, C.1, C.2, . . . , C.m, are shown in Table 1 provided below.

TABLE 1

Intake constraints

| C | λ | k | $\mu^{(k)}(\lambda)$ |
|---|---|---|---|
| C.0 | $\lambda_0$ | $k_0$ | $\mu^{(k0)}(\lambda_0)$ |
| C.1 | $\lambda_1$ | $k_1$ | $\mu^{(k1)}(\lambda_1)$ |
| C.2 | $\lambda_2$ | $k_2$ | $\mu^{(k2)}(\lambda_2)$ |
| . | . | . | . |
| . | . | . | . |
| . | . | . | . |
| C.m | $\lambda_m$ | $k_m$ | $\mu^{(km)}(\lambda_m)$ |

Table 1 includes the intake constraints C, values of the non-dimensional parameter corresponding to the intake constraints, order k of their derivatives (i.e., k denotes $k^{th}$ derivative) and the magnitude $\mu^{(k)}(\lambda)$, i.e., value of the $k^{th}$ derivate of the function $\mu(\lambda)$ at a given value of λ. For example, $\mu^{(k1)}(\lambda_1)$ denotes a value of the $k_1^{th}$ derivate of the function μ at a value $\lambda_1$. The value of k may determine a type of the corresponding constraint. For example, k=0 is for a positional constraint, k=1 is for a gradient constraint, and k=2 is for a second derivative constraint. A radius of curvature constraint may also be present. The radius of curvature constraint may be a function of first derivative and second derivatives of the function $\mu(\lambda)$. For example, C.3 may correspond to the radius of curvature constraint at $\lambda=\lambda_3$, i.e.

$$, C.3 = \frac{[1+(\mu^1(\lambda_3))^2]^{\frac{3}{2}}}{|\mu^2(\lambda_3)|}.$$

The axial length $L_{int}$ of the air intake 107 is defined relative to the longitudinal centre line 51. An axial parameter L of the intake lines 400 is less than or equal to the axial length $L_{int}$ ($L \leq L_{int}$). The non-dimensional parameter λ is defined as a ratio of the axial parameter L to the axial length $L_{int}$, in accordance with Equation 7 provided below.

$$\lambda = \frac{L}{L_{int}} \quad \text{[Equation 7]}$$

In some embodiments, a minimum value of the non-dimensional parameter λ is zero. In some other embodiments, a maximum value of the non-dimensional parameter λ is one. The non-dimensional parameter λ may therefore vary between zero and one (0≤λ≤1).

A radius x of the internal surface 212 of the nacelle 100 is defined relative to the longitudinal centre line 51. The non-dimensional parameter μ is defined as a ratio of the radius x of the internal surface 212 to the axial length $L_{int}$ of the air intake 107, in accordance with Equation 8 provided below.

$$\mu = \frac{x}{L_{int}} \quad \text{[Equation 8]}$$

The radius x may be measured along the radial direction rd of FIG. 4.

Equation 4 further includes the term $K_{i,m}$ which is defined by Equation 9 provided below.

$$K_{i,m} = \frac{m!}{i!(m-1)} \quad \text{[Equation 9]}$$

The term Δμ included in Equation 4 is defined by Equation 10 provided below.

$$\Delta\mu = \mu_{\lambda=1} - \mu_{\lambda=0} \quad \text{[Equation 10]}$$

Therefore, Δμ is the difference between a value of μ corresponding to λ=1, and a value of μ corresponding to λ=0.

Further, Equation 4 includes the Bernstein polynomial coefficients $cp_i$ which are obtained by solving a set of linear equations provided by the intake constraints C. The set of linear equations is defined by Equation 11 provided below.

$$A1 \cdot X1 = B1 \quad \text{[Equation 11]}$$

where A1, B1 and X1 are matrices of coefficients, constants, and solutions, respectively.

All the terms in Equation 4 are obtained, therefore, geometry of the air intake 107 is now analytically defined by Equation 4 and can be plotted. Equation 4 therefore provides an axial variation of the radius x of the of the internal surface 212 for a given azimuthal angle (for example, ϕ=0 degree). Equation 4 can be used to determine any one of the lines 402, 404, 406 and 408 by selecting the appropriate intake constraints. In an embodiment, the intake constrains may be defined for the corresponding lines 402, 404, 406 and 408 based on application requirements of the nacelle 100.

Once the intake lines 400 are determined, azimuthal variation of the internal surface 212 between the intake lines 400 at any axial location along the longitudinal centre line 51 may be determined to fully define the nacelle 100 in a three-dimensional space. The internal surface 212 of the nacelle 100 at least partially defines the air intake 107. In some embodiments, the internal surface 212 of the nacelle 100 between the plurality of intake lines 400 at a given axial location along the longitudinal centre line 51 is defined by Equation 12 provided below.

$$\xi(\psi) = \Sigma_{i=0}^{n}[bp_i K_{i,n}(\psi^i(1-\psi)^{n-i})] + \psi\Delta\xi \quad \text{[Equation 12]}$$

where ψ and ξ are two non-dimensional parameters.

Equation 12 is another Bernstein polynomial. Therefore, Equation 12 is defined as a sum of the term ψΔξ and a product of a class function C1(ψ) and a shape function S1(ψ).

In case of azimuthal parameterisation, the class function C1(ψ) is defined by Equation 13 provided below.

$$C1(\psi) = 1 \quad \text{[Equation 13]}$$

In Equation 12, Equation 13 is employed as the class function C1(ψ). Further, the class function C1(ψ) is modified by the shape function $S1(\psi)$. The shape function $S1(\psi)$ is defined by Equation 14 provided below.

$$S1(\psi) = \Sigma_{i=0}^{n}[bp_i K_{i,n}(\psi^i(1-\psi)^{n-i})]$$ [Equation 14]

Referring to Equation 12, n is a positive integer corresponding to (n+1) number of radial azimuthal constraints R, and i is an integer varying from 0 to n (0≤i≤n). The radial azimuthal constraints include at least one positional constraint, at least one gradient constraint, at least one second derivative constraint and at least one radius of curvature constraint. (n+1) number of the radial azimuthal constraints R further defined as R.0, R.1, R.2, ..., R.n, are shown in Table 2 provided below.

TABLE 2

Radial azimuthal constraints

| R | $\psi$ | k | $\xi^{(k)}(\psi)$ |
|---|---|---|---|
| R.0 | $\psi_0$ | $k_0$ | $\xi^{(k0)}(\psi_0)$ |
| R.1 | $\psi_1$ | $k_1$ | $\xi^{(k1)}(\psi_1)$ |
| R.2 | $\psi_2$ | $k_2$ | $\xi^{(k2)}(\psi_2)$ |
| . | . | . | . |
| . | . | . | . |
| . | . | . | . |
| R.n | $\psi_n$ | $k_n$ | $\xi^{(kn)}(\psi_n)$ |

Table 2 includes the radial azimuthal constraints R, values of the non-dimensional parameter $\psi$ corresponding to the radial azimuthal constraints, order k of their derivatives (i.e., k denotes $k^{th}$ derivative) and the magnitude $\xi^{(k)}(\psi)$, i.e., value of the $k^{th}$ derivate of the function $\xi(\psi)$ at a value $\psi$. For example, $\xi^{(k1)}(\psi_1)$ denotes a value of the $k_1^{th}$ derivative of the function $\xi(\psi)$ at a given value of $\psi$. The value of k may determine a type of the corresponding constraint. For example, k=0 is for a positional constraint, k=1 is for a gradient constraint, and k=2 is for a second derivative constraint. A radius of curvature constraint may also be present. The radius of curvature constraint may be a function of first derivative and second derivatives of the function $\xi(\psi)$. For example, R.3 may correspond to the radius of curvature constraint at $\psi=\psi_3$, i.e., $$, R.3 = \frac{[1+(\xi^1(\psi_3))^2]^{\frac{3}{2}}}{|\xi^2(\psi_3)|}.$$

The non-dimensional parameter $\psi$ is defined as a ratio between the azimuthal angle $\phi$ and the maximum value of azimuthal angle $\theta$, defined by Equation 15 provided below.

$$\psi = \frac{\phi}{\theta}$$ [Equation 15]

where, the non-dimensional parameter $\psi$ varies from 0 to 1 (0≤$\psi$≤1). As described above, 0≤1≤$\theta$.

Referring to FIGS. 2 to 4, a radius r of the internal surface 212 of the nacelle 100 is generally defined relative to the longitudinal centre line 51 at the given axial position. The radius r is measured along the radial direction rd shown in FIG. 4. In some embodiments, a radius r' of the internal surface 212 of the nacelle 100 is defined relative to the intake construction line 301 passing through the midpoint 303 and measured parallel to the scarf line 302. Specifically, the radius r' of the internal surface 212 of the nacelle 100 is measured in a direction parallel to the scarf line 302 relative to the intake construction line 301. The radius r' may be therefore inclined to the radius r. The radius r can correspond to any radial parameter along the longitudinal centre line 51, such as the maximum radius $R_{max}$. Further, the radius r' can correspond to any radial parameter along the intake construction line 301, such as the throat radius $R_{th}$ and the highlight radius $R_{hi}$. In some embodiments, Equation 12 provides an azimuthal variation of the radius r of the internal surface 212 of the nacelle 100 at the given axial position. In other words, given an axial position of the radius r of the internal surface 212 of the nacelle 100, Equation 12 provides the azimuthal variation of the radius r at the given axial position. For example, referring to FIG. 3A, given an axial location a1 along the longitudinal centre line 51, Equation 12 provides the azimuthal variation of the radius r of the internal surface 212 of the nacelle 100 at the axial location a1. The radial azimuthal constraints R may be provided for the axial location a1. At least some of the radial azimuthal constraints for the axial location a1 can be determined using the intake lines 400. As described above, the intake lines 400 may be determined using Equation 4 and appropriate intake constraints.

In some embodiments, the radius r of the internal surface 212 of the nacelle 100 may correspond to the throat radius $R_{th}$. In some embodiments, the throat radius Rh may have a fixed axial position along the longitudinal centre line 51. However, in some other embodiments, the axial location of the throat radius $R_{th}$ may vary based on the azimuthal variation of the aspect ratio AR. Given the axial location of the throat radius $R_{th}$, the azimuthal variation of the throat radius $R_{th}$ can be found using Equation 12 and the corresponding radial azimuthal constraints at the axial location.

The non-dimensional parameter $\xi$ is defined as a ratio between the radius r of the internal surface 212 and the maximum value of azimuthal angle $\theta$, in accordance with Equation 16 provided below.

$$\xi = \frac{r}{\theta}$$ [Equation 16]

Equation 12 further includes the term $K_{i,n}$ which is defined by Equation 17 provided below.

$$K_{i,n} = \frac{n!}{i!(n-1)}$$ [Equation 17]

The term $\Delta\xi$ included in Equation 12 is defined by Equation 18 provided below.

$$\Delta\xi = \xi_{\psi=1} - \xi_{\psi=0}$$ [Equation 18]

Therefore, $\Delta\xi$ is the difference between a value of $\xi$ corresponding to $\psi=1$, and a value of $\xi$ corresponding to $\psi=0$.

Further, $bp_i$ is an $i^{th}$ Bernstein polynomial coefficient. Since Equation 13 is employed as the class function $C1(\psi)$, $0^{th}$ and $n^{th}$ Bernstein polynomial coefficients $bp_0$, $bp_n$ are defined by Equations 19 and 20 provided below.

$$bp_0 = 0$$ [Equation 19]

$$bp_i = 0$$ [Equation 20]

The remaining Bernstein polynomial coefficients $bp_i$ are obtained by solving a set of (n−1) linear equations provided by the radial azimuthal constraints R. The set of linear equations is defined by Equation 21 provided below.

$$A2 \cdot X2 = B2 \qquad \text{[Equation 21]}$$

where A2, B2 and X2 are matrices of coefficients, constants, and solutions, respectively.

The azimuthal variation of the radius r of the internal surface 212 of the nacelle 100 at any given axial location along the longitudinal centre line 51 is defined fully and analytically using Equation 12. Specifically, a complete three-dimensional (3D) internal surface can be analytically defined as the internal surface 212 between the intake lines 400 by using Equation 12 and the radial azimuthal constraints R. Thus, the internal surface 212 is defined more accurately than conventional lofting processes.

Figure 5:
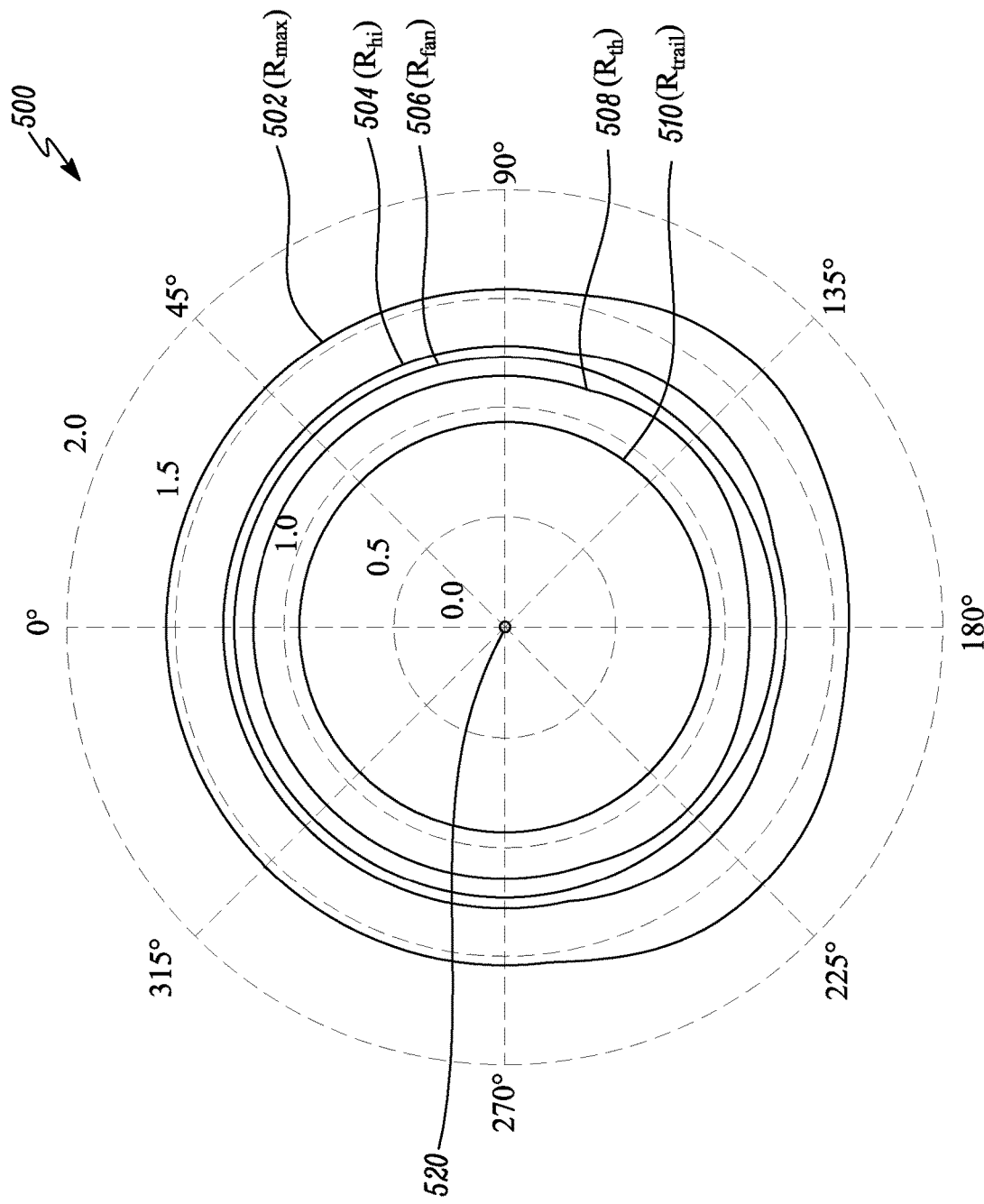
FIG. 5 shows azimuthal distributions of various parameters of a nacelle.

FIG. 5 illustrates exemplary azimuthal distributions 500 determined using Equation 12 and appropriate radial azimuthal constraints. Referring to FIGS. 2, 3A, 3B and 5, the azimuthal distributions 500 are shown for various intake parameters of the nacelle 100 at corresponding axial positions along the longitudinal centre line 51. The azimuthal distributions 500 include an azimuthal distribution 502 of the maximum radius $R_{max}$, an azimuthal distribution 504 of the highlight radius $R_{hi}$, an azimuthal distribution 506 of the fan radius $R_{fan}$, an azimuthal distribution 508 of the throat radius $R_{th}$, and an azimuthal distribution 510 of the trailing edge radius $R_{trail}$. In the illustrated embodiment, the azimuthal distributions 506, 510 of the fan radius $R_{fan}$ and the trailing edge radius $R_{trail}$, respectively, are generally circular. In other words, the azimuthal distributions 506, 510 may be symmetric along any possible axis plane passing through a centre 520. However, the azimuthal distributions 502, 504, 508 are non-axisymmetric. The azimuthal distributions 502, 504, 508 may have an axial plane of symmetry oriented along $\phi=0$ degree and $\phi=180$ degrees.

In addition to the radius r of the internal surface 212 of the nacelle 100, a similar approach can also be used to determine azimuthal variations of various other parameters of the nacelle 100, such as the contraction ratio CR, the aspect ratio AR, the lip factor $F_{lip}$, etc.

In some embodiments, an azimuthal variation of a parameter y of the nacelle 100 at the given axial position along the longitudinal centre line 51 is defined by Equation 22 provided below.

$$\omega(\psi) = \Sigma_{i=0}^{p}[dp_i K_{i,p}(\psi^i(1-\psi)^{p-i})] + \psi \Delta \omega \qquad \text{[Equation 22]}$$

where $\psi$ and $\omega$ are two non-dimensional parameters.

Equation 22 is another Bernstein polynomial. Therefore, Equation 22 is defined as a sum of the term $\psi \Delta \omega$ and a product of the class function $C1(\psi)$ and a shape function $S2(\psi)$. In Equation 22, Equation 13 is employed as the class function $C1(\psi)$. Further, the class function $C1(\psi)$ is modified by the shape function $S2(\psi)$. The shape function $S2(\psi)$ is defined by Equation 23 provided below.

$$S2(\psi) = \Sigma_{i=0}^{p}[dp_i K_{i,p}(\psi^i(1-\psi)^{p-i})] \qquad \text{[Equation 23]}$$

Referring to Equation 6, p is a positive integer corresponding to (p+1) number of parameter azimuthal constraints $C_{azi}$ and i is an integer varying from 0 to p (0≤i≤p). (p+1) number of the parameter azimuthal constraints $C_{azi}$ further defined as $C_{azi} \cdot 0, C_{azi} \cdot 1, C_{azi} \cdot 2 \ldots, C_{azi} \cdot p$, are shown in Table 3 provided below.

TABLE 3

| Parameter azimuthal constraints | | | |
|---|---|---|---|
| $C_{azi}$ | $\psi$ | k | $\omega^{(k)}(\psi)$ |
| $C_{azi} \cdot 0$ | $\psi_0$ | $k_0$ | $\omega^{(k0)}(\psi_0)$ |
| $C_{azi} \cdot 1$ | $\psi_1$ | $k_1$ | $\omega^{(k1)}(\psi_1)$ |
| $C_{azi} \cdot 2$ | $\psi_2$ | $k_2$ | $\omega^{(k2)}(\psi_2)$ |
| . | . | . | . |
| . | . | . | . |
| . | . | . | . |
| $C_{azi} \cdot p$ | $\psi_p$ | $k_p$ | $\omega^{(kp)}(\psi_p)$ |

Table 3 includes the non-dimensional parameter $\psi$, k as order of their derivatives, and the magnitude $\omega^{(k)}(\psi)$. The parameter azimuthal constraints $C_{azi}$, values of the non-dimensional parameter $\psi$ corresponding to the parameter azimuthal constraints $C_{azi}$, order k of their derivatives (i.e., k denotes $k^{th}$ derivative) and the magnitude $\omega^k(\psi)$, i.e., value of the $k^{th}$ derivate of the function $\omega(\psi)$ at a value $\psi$. For example, $\omega^{(k1)}(\psi_1)$ denotes a value of the $k_1^{th}$ derivate of the function $\omega(\psi)$ at a given value of $\psi$. The value of k may determine a type of the corresponding constraint. For example, k=0 is for a positional constraint, k=1 is for a gradient constraint, and k=2 is for a second derivative constraint. A radius of curvature constraint may also be present. The radius of curvature constraint may be a function of first derivative and second derivatives of the function $\omega(\psi)$. For example, $C_{azi} \cdot 3$ may correspond to the radius of curvature constraint at $\psi = \psi_3$, i.e., $$C_{azi} \cdot 3 = \frac{[1 + (\omega^1(\psi_3))^2]^{\frac{3}{2}}}{|\omega^2(\psi_3)|}.$$

The non-dimensional parameter $\psi$ is defined as a ratio between the azimuthal angle $\phi$ and the maximum value of azimuthal angle $\theta$, defined by Equation 15.

The non-dimensional parameter $\omega$ is defined as a ratio between the parameter y of the nacelle 100 and the maximum value of azimuthal angle $\theta$, in accordance with Equation 24 provided below.

$$\omega = \frac{y}{\theta} \qquad \text{[Equation 24]}$$

Equation 22 further includes the term $K_{i,p}$ which is defined by Equation 25 provided below.

$$K_{i,p} = \frac{p!}{i!(p-1)} \qquad \text{[Equation 25]}$$

The term $\Delta \omega$ included in Equation 22 is defined by Equation 26 provided below.

$$\Delta \omega = \omega_{\psi=1} - \omega_{\psi=0} \qquad \text{[Equation 26]}$$

Therefore, $\Delta \omega$ is the difference between a value of $\omega$ corresponding to $\psi = 1$, and a value of $\omega$ corresponding to $\psi = 0$.

Further, Equation 22 includes Bernstein polynomial coefficients $dp_i$. Equation 13 is employed as the class function $C1(\psi)$, therefore, $0^{th}$ and $p^{th}$ Bernstein polynomial coefficients $dp_0, dp_p$ are defined by Equations 27 and 28 provided below.

$$dp_0 = 0 \qquad \text{[Equation 27]}$$

$$dp_p = 0 \qquad \text{[Equation 28]}$$

The remaining Bernstein polynomial coefficients $dp_i$ are obtained by solving a set of (p−1) linear equations provided by the azimuthal constraints $C_{azi}$. The set of linear equations is defined by Equation 29 provided below.

$$A3 \cdot X3 = B3 \qquad \text{[Equation 29]}$$

where A3, B3 and X3 are matrices of coefficients, constants, and solutions, respectively.

In some embodiments, the contraction ratio CR may be the parameter y of the nacelle 100. In some other embodiments, the aspect ratio AR may be parameter y of the nacelle 100. In some other embodiments, the lip factor $F_{lip}$ may be the parameter y of the nacelle 100.

Azimuthal distribution of the parameter y of the nacelle 100 at a given axial position is defined fully and analytically using Equation 22. Therefore, using Equation 22 and appropriate parameter azimuthal constraints, various intuitive design parameters of the nacelle 100 can be defined fully in a three-dimensional space. This may enable the intuitive design parameters to be directly used in the design of the nacelle 100, thereby simplifying the overall design process.

Further, the azimuthal variations of first or higher order derivates of a parameter of the nacelle 100 may also be determined using the approach of the present disclosure. Some exemplary variations for different order derivates are shown in FIGS. 6 and 7.

Figure 6:
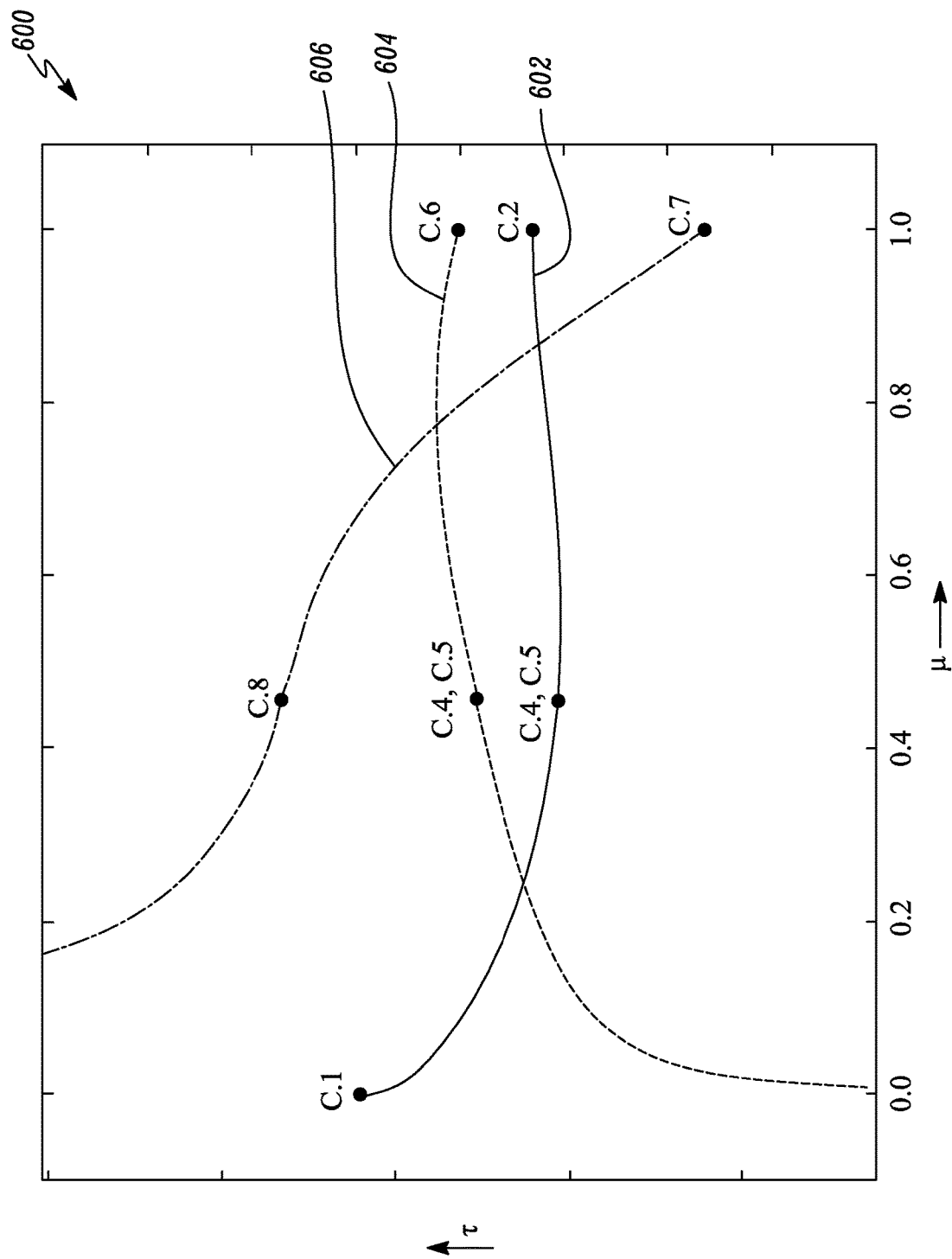
FIG. 6 is a graph illustrating various curves for an air intake of a nacelle.
Figure 7:
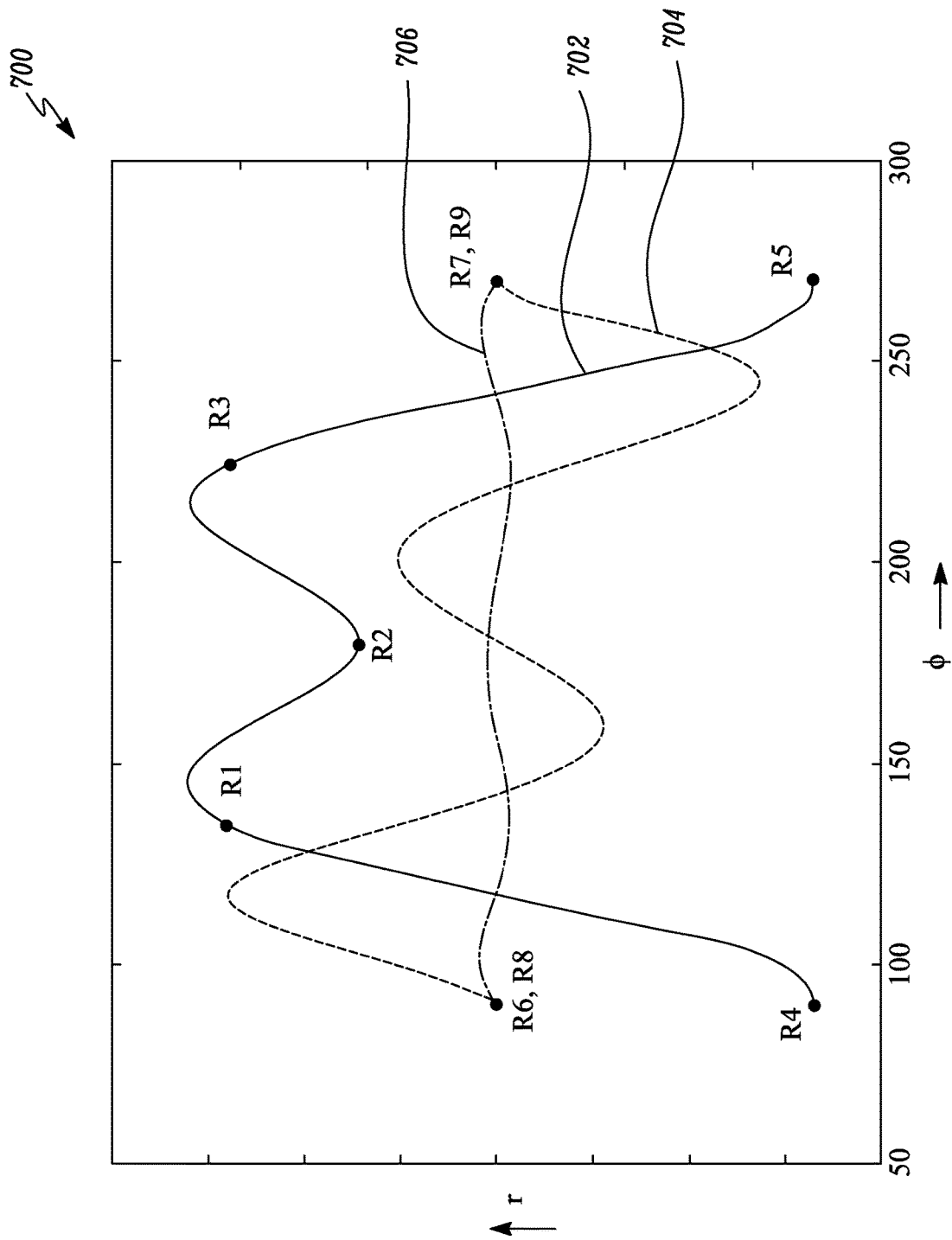
FIG. 7 is a graph illustrating an azimuthal variation of a parameter of a nacelle.

FIG. 6 is a graph 600 illustrating variations between two non-dimensional parameters µ and τ. Specifically, the graph 600 shows curves representing an air intake curve, a first order derivative of the air intake curve, and a second order derivatives of the air intake curve. The graph 600 has an axis of abscissas representing the non-dimensional parameter µ. The non-dimensional parameter µ is defined as a ratio between the radius x of the internal surface 212 and the axial length $L_{int}$, defined by Equation 8. Further, the graph 600 has an axis of ordinates representing the non-dimensional parameter τ. The non-dimensional parameter τ is defined as a ratio between the radius r of the internal surface 212 and the highlight radius $R_{hi}$, in accordance with Equation 30 provided below.

$$\tau = \frac{r}{R_{hi}} \qquad \text{[Equation 30]}$$

The graph 600 includes a curve 602, a curve 604 and a curve 606. The curve 602 a zero-order derivative curve of the non-dimensional parameter τ, the curve 604 shows a first order derivative curve of the non-dimensional parameter τ, and the curve 606 shows a second order derivative curve of the non-dimensional parameter τ. The curve 602 illustrates the air intake curve which depends on the intake constraints C.1, C.2, C.4, C.5. The curve 602 originates from the intake constraint C.1, follows the intake constraints C.4, C.5 and then terminates at the intake constraint C.2. The curve 604 illustrates the first order derivative of the air intake curve which depends on the intake constraints C.4, C.5, C.6. The curve 604 originates from infinity, follows the intake constraints C.4, C.5 and then terminates at the intake constraint C.6. The curve 606 illustrates the second order derivative of the air intake curve which depends on the intake constraints C.7, C.8. The curve 606 originates from infinity, follows the intake constraints C.8 and then terminates at the intake constraint C.7.

FIG. 7 is a graph 700 illustrating variations between the azimuthal angle ϕ and the radius r of the internal surface 212 of the nacelle 100. Specifically, the graph 700 shows curves representing azimuthal variations of the highlight radius $R_{hi}$, a first order derivative of the highlight radius $R_{hi}$, and a second order derivative of the highlight radius $R_{hi}$. The graph 700 has an axis of abscissas representing the azimuthal angle ϕ and an axis of ordinates representing the radius r of the internal surface 212. The graph includes a curve 702, a curve 704 and a curve 706. The curve 702 shows a zero-order derivative curve, the curve 704 shows a first order derivative curve, and the curve 706 shows a second order derivative curve. The curve 702 illustrates an azimuthal variation of the highlight radius $R_{hi}$ which depends on the azimuthal constraints R.1 to R.5. The curve 702 originates from the azimuthal constraints R.4, follows the azimuthal constraints R.1, R.2, R.3 and then terminates at the azimuthal constraint R.5. The curve 704 and the curve 706 illustrate the azimuthal variations of the first order derivative and the second order derivative of the highlight radius $R_{hi}$ which depends on the azimuthal constraints R.6 to R.9. Both the curves 704, 706 originate from the azimuthal constraints R.6, R.8 and terminates at the azimuthal constraints R.7, R.9. However, the variation of the curve 704 in the axis of ordinates is greater than the variation of the curve 706 in the axis of ordinates.

Figure 8:
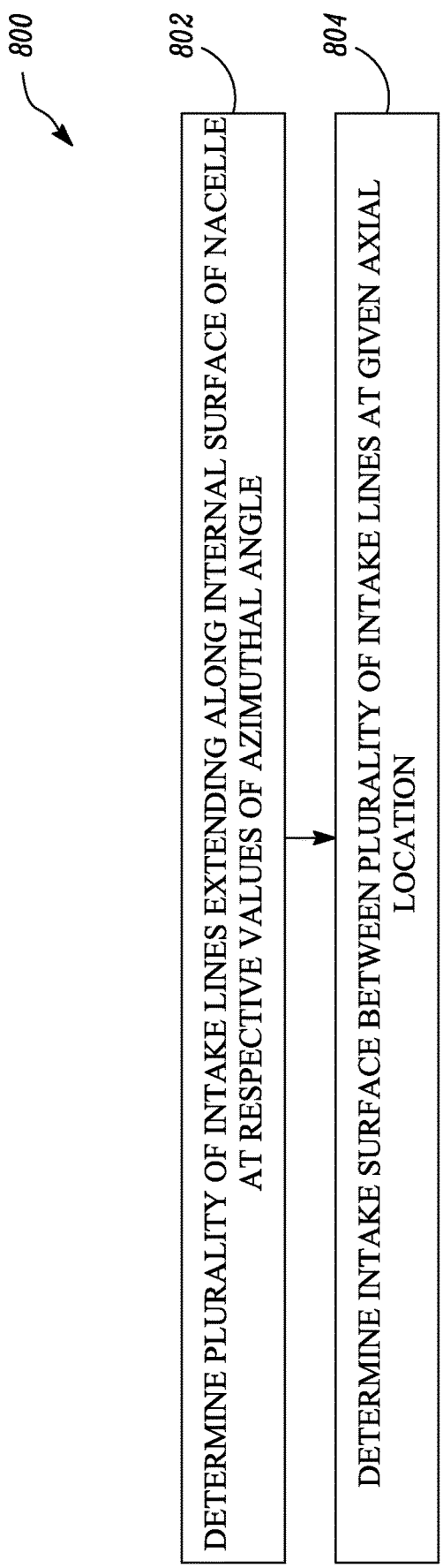
FIG. 8 is a flowchart of a method of designing a nacelle for a gas turbine engine.

FIG. 8 is a flowchart showing a method 800 of designing a nacelle for the gas turbine engine having a longitudinal centre line. Reference will also be made to FIGS. 2, 3A, 3B, 4 and 5.

At step 802, the method 800 includes determining the plurality of intake lines 400 extending along the internal surface 212 of the nacelle 100 at respective values (for example, 0 degree, 90 degrees, 180 degrees, etc.) of the azimuthal angle ϕ. The azimuthal angle ϕ is defined about the longitudinal centre line 51. Each intake line 400 axially defines the air intake 107 along the longitudinal centre line 51 at the respective value of the azimuthal angle ϕ. In some embodiments, each intake line 400 at the respective value of the azimuthal angle ϕ is determined by Equation 4 provided above and the intake constraints C. In some embodiments, the intake constraints C for each intake line 400 includes at least one positional constraint, at least one gradient constraint, at least one second derivative constraint and at least one radius of curvature constraint.

At step 804, the method 800 further includes determining the internal surface 212 between the plurality of intake lines 400 at a given axial location along the longitudinal centre line 51 by using Equation 12 provided above and the radial azimuthal constraints R. In some embodiments, the radial azimuthal constraints R include at least one positional constraint, at least one gradient constraint, at least one second derivative constraint and at least one radius of curvature constraint.

The azimuthal distribution of the parameters at the axial position other than the intake lines is calculated using the analytical approach. In other words, the azimuthal distribution of the parameters between the intake lines at the given axial location is calculated using the analytical approach. In some embodiments, the method 800 further includes determining the azimuthal variation of the parameter y of the nacelle 100 at the given axial position along the longitudinal centre line 51 by using Equation 22 provided above and the parameter azimuthal constraints $C_{azi}$. In some embodiments, the parameter y may include the aspect ratio AR, the contraction ratio CR, and the lip factor $F_{lip}$.

Comparative Example 1

The analytical approach, as described above, defines the azimuthal distribution of the parameter in one expression or in a piecewise fashion. The expression is applied over the azimuthal extent which was defined by c. In this example, the azimuthal extent c was the maximum value of the azimuthal angle θ. The parameters include the aspect ratio AR, the contraction ratio CR, and the lip factor $F_{lip}$, etc. The local value of the parameter was defined as y. The azimuthal distribution of the parameter y of the nacelle was defined by Equation 31 provided below.

$$\omega(\psi) = \Sigma_{i=0}^{p}[dp_i K_{i,p}(\psi^i(1-\psi)^{p-i})]C1(\psi) + \psi\Delta\omega \quad \text{[Equation 31]}$$

Equation 31 is based on a Bernstein polynomial. The non-dimensional parameter ψ was defined as the ratio between the azimuthal angle ϕ and the maximum value of azimuthal angle θ, as shown in Equation 15. Further, the non-dimensional parameter ω was defined as the ratio between the local value of parameter y at a given position and the maximum value of azimuthal angle θ, as shown in Equation 24. Further, p number of azimuthal constraints was applied. The parameter azimuthal constraints were defined by $C_{azi}.1$, $C_{azi}.2$ $C_{azi}.p$, shown in Table 4 provided below.

TABLE 4

| Parameter azimuthal constraints | | | |
|---|---|---|---|
| | ψ | k | $\omega^{(k)}(\psi)$ |
| $C_{azi} \cdot 1$ | $\psi_1$ | $k_1$ | $\omega^{(k1)}(\psi_1)$ |
| $C_{azi} \cdot 2$ | $\psi_2$ | $k_2$ | $\omega^{(k2)}(\psi_2)$ |
| . | . | . | . |
| . | . | . | . |
| . | . | . | . |
| $C_{azi} \cdot p$ | $\psi_p$ | $k_p$ | $\omega^{(kp)}(\psi_p)$ |

Table 4 includes the non-dimensional parameter ψ, order of derivatives k, and the magnitude $\omega^{(k)}(\psi)$. The azimuthal constraint $C_{azi}.p$ was the $p^{th}$ constraint and k was the order for the $k^{th}$ derivative, for example, k=0 for a positional constraint and k=1 for a gradient constraint.

In Equation 31, Equation 13 is employed as the class function C1(ψ). After employing the class function C1(ψ), Equation 31 becomes Equation 22. Therefore, $0^{th}$ and $p^{th}$ Bernstein polynomial coefficients $dp_0$, $dp_p$ were defined by Equations 27 and 28.

$$dp_0 = 0 \quad \text{[Equation 27]}$$

$$dp_p = 0 \quad \text{[Equation 28]}$$

Next step involved construction of a linear set of equations, defined by Equation 29.

$$A3 \cdot X3 = B3 \quad \text{[Equation 29]}$$

Referring to Equation 29 above, A3, B3 and X3 were the matrices of coefficients, constant terms, and solutions, respectively. For each azimuthal constraint, an equation was added to the linear set of equations which relates the azimuthal constraint to the Bernstein polynomial coefficients $dp_i$, defined by Equation 32 provided below.

$$\omega^{(k)}(\psi) = [\Sigma_{i=0}^{p}[dp_i K_{i,p}(\psi^i(1-\psi)^{p-i})] + \psi\Delta\omega]^{(k)} \quad \text{[Equation 32]}$$

Equation 29 was then inverted to solve for the Bernstein polynomial coefficients $dp_i$. All the terms in Equation 31 were then extracted. The azimuthal distributions of the parameter of the nacelle were defined fully and analytically.

Referring to FIGS. 2, 3A, 3B, 4 and 5, another example is provided for geometric parameterization of the intake lines 400 of the nacelle 100. In this example, the air intake 107 of the nacelle 100 was considered. The air intake 107 includes the intake lines 400. Each intake line 400 at the respective value of the azimuthal angle ϕ is defined by Equation 33 provided below.

$$\mu(\lambda) = \Sigma_{i=0}^{m}[cp_i K_{i,m}(\lambda^i(1-\lambda)^{m-i})]C(\lambda) + \lambda\Delta\mu \quad \text{[Equation 33]}$$

where μ and λ are two non-dimensional parameters.

The class function C(λ) in Equation 33 is defined by Equation 5. After employing the class function C(λ), Equation 33 becomes Equation 4.

The various intake parameters for defining the air intake 107 and their respective values are shown in Table 5 provided below.

TABLE 5

| Intake parameters | | |
|---|---|---|
| | Parameter | Value |
| P.1 | $R_{hi}$ | 1.779 |
| P.2 | $R_{fan}$ | 1.715 |
| P.3 | $L_{int}$ | 1.2 |
| P.4 | $F_{lip}$ | 0.700 |
| P.5 | CR | 1.263 |
| P.6 | AR | 2.5 |
| P.7 | $\kappa_{th}$ | 0.9 |
| P.8 | $\beta_{int}$ | 0° |
| P.9 | $\kappa_{fan}$ | 1.2 |

The parameters are the highlight radius $R_{hi}$, the fan radius $R_{fan}$, the axial length $L_{int}$ of the air intake 107, the lip factor $F_{lip}$, the contraction ratio CR, the aspect ratio AR, the curvature $\kappa_{th}$ at the throat 110 of the air intake 107, the angle $\beta_{int}$ of the internal surface 212 of the air intake 107 and a curvature $\kappa_{fan}$ at the air intake trailing edge 216. In Table 5, the parameters and local values of the parameters are provided. In Table 5, the parameters are defined by P.1, P.2, P.3, P.4, P.5, P.6, P.7, P.8, and P.9, respectively.

The geometric parameterisation of the intake lines 400 of the air intake 107 may be done with multiple approaches. In this example, the approach used for geometric parameterisation of the intake lines 400 of the air intake 107 was intuitive Class Shape Transformation (iCST) approach. The parameters in Table 5 were converted into respective intake constraints C for the iCST parameterisation by non-dimensionalisation of the parameters by the axial length $L_{int}^{k-1}$. The intake constraints C are shown in Table 6 provided below.

TABLE 6

| Intake constraints | | | | |
|---|---|---|---|---|
| C | Type | k | λ | $\mu^{(k)}(\lambda)$ |
| C.1 | Position | 0 | 0.000 | 1.483 |
| C.2 | Position | 0 | 1.000 | 1.429 |
| C.3 | Radius of curvature | 0 | 0.000 | $4.57 \times 10^{-2}$ |
| C.4 | Position | 0 | 0.456 | 1.319 |
| C.5 | Gradient | 1 | 0.456 | 0.0 |
| C.6 | $2^{nd}$ derivative | 2 | 0.456 | 1.080 |
| C.7 | $2^{nd}$ derivative | 2 | 1.000 | 1.440 |
| C.8 | Gradient | 1 | 1.000 | 0.000 |

In Table 6, the intake constraints C, types of constraints, order of derivative k, a non-dimensional parameter λ, and magnitude of constraints $\mu^{(k)}(\lambda)$ are provided. In Table 6, the constraints C are defined by C.1, C.2, C.3, C.4, C.5, C.6, C.7, and C.8, respectively.

The parameters P.1 and P.2 correspond to the highlight radius $R_{hi}$ and the fan radius $R_{fan}$, respectively. The parameters P.1 and P.2 were simply endpoints of the intake lines

400 of the air intake 107; therefore, the constraints C.1 and C.2 were calculated by dividing the parameters P.1 and P.2 by the axial length $L_{int}$ (the parameter P.3), respectively. The lip radius $R_{lip}$ was calculated from the parameter P.4 by Equation 3 and then non-dimensionalised by the axial length $L_{int}$ to give the constraint C.3. Further, an axial position of the throat 110 of the air intake 107 was calculated from the contraction ratio CR and the aspect ratio AR (the parameters P.5 and P.6, respectively) and then non-dimensionalised by the axial length $L_{int}$ to give the constraint C.4. Further, the gradient constraint C.5 of zero magnitude was applied at the axial position of the throat 110 to ensure that the throat 110 of the air intake 107 is a local maximum. The parameter P.7 defined the curvature $\kappa_{th}$ at the throat 110. The curvature $\kappa_{th}$ is a function of the first and second derivatives of the curve, defined by Equation 34 provided below.

$$\kappa th = \frac{\frac{d^2 y}{dx^2}}{\left[1+\left(\frac{dy}{dx}\right)^2\right]^{\frac{3}{2}}} \quad \text{[Equation 34]}$$

The gradient constraint C.5 was already defined, therefore, the associated second derivative can be calculated and then non-dimensionalised by multiplying by the axial length $L_{int}$ resulting in the constraint C.6. Further, another gradient constraint at the air intake trailing edge 216 was defined by the angle $\beta$int (the parameter P.8) and becomes the constraint C.8. The parameter P.9 defined the curvature $\kappa_{fan}$ at the fan section leading edge 216. The curvature $\kappa_{fan}$ is also a function of the first and second derivatives of the curve defined by Equation 34. The gradient constraint C.7 was already defined, therefore, the associated second derivative was calculated and then non-dimensionalised by multiplying by the axial length $L_{int}$ resulting in the constraint C.7.

Equation 5 was employed as the class function $C(\lambda)$, therefore, $0^{th}$ and $m^{th}$ Bernstein polynomial coefficients $cp_0, cp_m$ were defined by Equations 35 and 36 provided below.

$$cp_0 = \sqrt{\frac{2R_{lip}}{L_{int}}} \quad \text{[Equation 35]}$$

$$cp_m = \tan\beta_{int} + \frac{R_{hi} - R_{th}}{\theta} \quad \text{[Equation 36]}$$

The remaining four Bernstein polynomial coefficients $cp_i$ depend on the constraints C.4 to C.7 and were analytically calculated from intuitive variables through the construction of a transformation matrix. This process was carried out for a specific set of constraints.

The function's coefficients and constant terms were extracted analytically. A symbolic math module was then employed to solve the class function $C(\lambda)$ and its derivatives. The symbolic math module was implemented using a programming language, such as Python™. The shape function $S(\lambda)$ and its derivatives were solved by using the fact that derivatives of the $k^{th}$ degree Bernstein polynomials were polynomials of degree $(k-1)$ and were written as a linear combination of Bernstein polynomials. A linear set of equations was constructed with the extracted coefficients and constant terms, defined by Equation 11.

$$A1 \cdot X1 = B1 \quad \text{[Equation 11]}$$

In Equation 11, A1 was the matrix of coefficients, in accordance with Equation 37 provided below.

$$A1 = \begin{bmatrix} a_{1,1} & a_{1,2} & a_{1,3} & a_{1,4} \\ a_{2,1} & a_{2,2} & a_{2,3} & a_{2,4} \\ a_{3,1} & a_{3,2} & a_{3,3} & a_{3,4} \\ a_{4,1} & a_{4,2} & a_{4,3} & a_{4,4} \end{bmatrix} \quad \text{[Equation 37]}$$

In Equation 12, B1 was the matrix of constants which was defined by Equation 38 provided below.

$$B1 = [b_{1,0}\ b_{2,0}\ b_{3,0}\ b_{4,0}]^T \quad \text{[Equation 38]}$$

Further, the function coefficients were isolated by rearranging Equation 39 provided below.

$$\mu^{(k)}(\lambda) = [\Sigma_{i=0}^m [cp_i K_{i,m}(\lambda^i(1-\lambda)^{m-i})]\lambda^{1.0}(1-\lambda)^{0.5} + \lambda\Delta\mu]^{(k)} \quad \text{[Equation 39]}$$

Referring to Table 6, the constraint C.4 is a positional constraint, therefore $k=0$, $\lambda=0.456$ and $\mu^{(k)}(\lambda)=1.319$. Equation 39 was then rearranged to isolate the coefficients and constant terms to give $a_{1,m}$ and $b_{1,0}$. The constraint C.5 is a gradient constraint, therefore $k=1$, $\lambda=0.456$ and $\mu^{(k)}(\lambda)=0.0$. Equation 39 was then rearranged to isolate the coefficients and constant terms to give $a_{2,m}$ and $b_{2,0}$. The constraint C.6 is a second derivative constraint, therefore $k=2$, $\lambda=0.456$ and $\mu^{(k)}(\lambda)=1.08$. Equation 39 was then rearranged to isolate the coefficients and constant terms to give $a_{3,m}$ and $b_{3,0}$. The constraint C.7 is a second derivative constraint, therefore $k=2$, $\lambda=1.0$ and $\mu^{(k)}(\lambda)=1.44$. Equation 39 was then rearranged to isolate the coefficients and constant terms to give $a_{4,m}$ and $b_{4,0}$.

The Bernstein polynomial coefficients $cp_i$ were then calculated by inverting and solving Equation 11. Geometry of the example air intake (i.e., the air intake 107) was then defined fully analytically by Equation 33. The geometry of the example air intake was plotted (shown in FIG. 6).

Another example provides an azimuthal distribution of the radius r of the internal surface 212 of the nacelle 100 at a given axial position along the longitudinal centre line 51. The air intake 107 of the nacelle 100 was considered. The air intake 107 was symmetric about the y-normal plane with four intake lines. The radius r for each of the four intake lines was defined. The axial position was given by the azimuthal angle $\phi$.

The radius r of the nacelle 100 varies from 90 degrees (°) to 270°. As the air intake 107 was symmetric about the y-normal plane, the intake lines at 90° and 135° were mirrored in order to provide two parameters. The radial azimuthal parameters are shown in Table 7 provided below.

TABLE 7

| Radial azimuthal parameters | |
|---|---|
| $\phi$ | r |
| 90° | 2.457 |
| 135° | 2.518 |
| 180° | 2.504 |
| 225° | 2.518 |
| 270° | 2.457 |

The internal surface 212 of the nacelle 100 between the plurality of intake lines 400 at a given axial location along the longitudinal centre line 51 is defined by Equation 40 provided below.

$$\xi(\psi) = \Sigma_{i=0}^n [bp_i K_{i,n}(\psi^i(1-\psi)^{n-i})]C1(\psi) + \psi\Delta\xi \quad \text{[Equation 40]}$$

where $\psi$ and $\xi$ are two non-dimensional parameters.

In Equation 40, Equation 13 was employed as the class function C1($\psi$). After employing the class function C1($\psi$), Equation 40 becomes Equation 12.

In addition to the parameters in Table 7, other radial azimuthal constraints R were also imposed upon the azimuthal distribution in order to, e.g., ensure local maxima or minima of geometric continuity at a curve endpoint or ensure a specified level of geometric continuity at the curve endpoint. In this example, the gradient and the second derivative were set to zero at the distribution endpoints.

The radial azimuthal constraints R are shown in Table 8 provided below.

TABLE 8

Radial azimuthal constraints

| | Type | k | $\psi$ | $\xi^{(k)}$ ($\psi$) |
|---|---|---|---|---|
| R.1 | Position | 0 | 0.00 | 0.01365 |
| R.2 | Position | 0 | 1.00 | 0.01365 |
| R.3 | Position | 0 | 0.25 | 0.01399 |
| R.4 | Position | 0 | 0.50 | 0.01391 |
| R.5 | Position | 0 | 0.75 | 0.01399 |
| R.6 | Gradient | 1 | 0.00 | 0.00000 |
| R.7 | $2^{nd}$ derivative | 2 | 0.00 | 0.00000 |
| R.8 | Gradient | 1 | 1.00 | 0.00000 |
| R.9 | $2^{nd}$ derivative | 2 | 1.00 | 0.00000 |

Table 8 includes the radial azimuthal constraints R, types of constraints, order of derivative k, a non-dimensional parameter $\psi$, and magnitude of constraints $\xi^{(k)}(\psi)$. The radial azimuthal constraints R are defined by R.1, R.2, R.3, R.4, R.5, R.6, R.7, R.8, and R.9, respectively.

Equation 13 was employed as the class function C1($\psi$), therefore, $0^{th}$ and $n^{th}$ Bernstein polynomial coefficients $bp_0$, $bp_n$ were defined by Equations 19 and 20 provided below.

$$bp_0=0 \quad \text{[Equation 19]}$$

$$bp_n=0 \quad \text{[Equation 20]}$$

The remaining seven Bernstein Polynomial coefficients $bp_i$ depend on constraints R.3 to R.9 and were calculated by inverting and solving Equation 21 provided below.

$$A2 \cdot X2 = B2 \quad \text{[Equation 21]}$$

Referring to Equation 21, A2 was a matrix of coefficients, defined by Equation 41 provided below.

$$A2 = \begin{bmatrix} a_{1,1} & a_{2,1} & \cdots & a_{1,7} \\ a_{2,1} & a_{2,2} & \cdots & a_{2,7} \\ \vdots & \vdots & \ddots & \vdots \\ a_{7,1} & a_{7,2} & \cdots & a_{7,7} \end{bmatrix} \quad \text{[Equation 41]}$$

B2 was a matrix of constants defined by Equation 42 provided below.

$$B2 = [b_{1,0} \, b_{2,0} \ldots b_{7,0}]^T \quad \text{[Equation 42]}$$

For each constraint, an equation was added to the linear set of equations which relates the constraint to the Bernstein polynomial coefficient, defined by Equation 43 provided below.

$$\xi^{(k)}(\psi) = [\Sigma_{i=0}^n [bp_i K_{i,n}(\psi^i (1-\psi)^{n-i})] + \psi \Delta \xi]^{(k)} \quad \text{[Equation 43]}$$

The constraint $C_{azi}.3$ is a positional constraint, therefore k=0 and $\psi$=0.25 and $\xi^{(k)}(\psi)$=0.01399. Equation 45 was then rearranged to isolate the function coefficients and constant terms to give $a_{1,n}$ and $b_{1,0}$. The constraint R.4 is a positional constraint, therefore k=0 and $\psi$=0.50 and $\xi^{(k)}(\psi)$=0.01391. Equation 45 was then rearranged to isolate the function coefficients and constant terms to give $a_{2,n}$ and $b_{2,0}$. The constraint R.5 is a positional constraint, therefore k=0 and $\psi$=0.75 and $\xi^{(k)}(\psi)$=0.01399. Equation 45 was then rearranged to isolate the function coefficients and constant terms to give $a_{3,n}$ and $b_{3,0}$. The constraint R.6 is a gradient constraint, therefore k=1 and $\psi$=0.00 and $\xi^{(k)}(\psi)$=0.00. Equation 45 was then rearranged to isolate the function coefficients and constant terms to give 4, and $b_{4,0}$. The constraint R.7 is a $2^{nd}$ derivative constraint, therefore k=2 and $\psi$=0.00 and $\xi^{(k)}(\psi)$=0.00. Equation 45 was then rearranged to isolate the function coefficients and constant terms to give $a_{5,n}$ and $b_{5,0}$. The constraint R.8 is a gradient constraint, therefore k=1 and $\psi$=1.00 and $\xi^{(k)}(\psi)$=0.00. Equation 45 was then rearranged to isolate the function coefficients and constant terms to give $a_{6,n}$ and $b_{6,0}$. The constraint R.9 is a $2^{nd}$ derivative constraint, therefore k=2 and $\psi$=1.00 and $\xi^{(k)}(\psi)$=0.00. Equation 45 was then rearranged to isolate the function coefficients and constant terms to give $a_{7,n}$ and $b_{7,0}$.

The Bernstein polynomial coefficients $bp_i$ was then calculated by inverting and solving Equation 21. The azimuthal variation of $R_{hi}$ was then fully defined by Equation 40 and was plotted (shown in FIG. 7).

It will be understood that the present disclosure is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A nacelle for a gas turbine engine having a longitudinal centre line (51), the nacelle comprising:
   an air intake disposed at an upstream end of the nacelle, the air intake comprising, in flow series, an intake lip, a throat and a diffuser;
   an internal surface at least partially defining the air intake;
   an azimuthal angle defined about the longitudinal centre line; and
   a plurality of intake lines extending along the internal surface of the nacelle at respective values of the azimuthal angle, wherein each intake line axially defines the air intake along the longitudinal centre line at the respective value of the azimuthal angle;
   wherein the internal surface of the nacelle between the plurality of intake lines at a given axial location along the longitudinal centre line is defined by the equation:

$$\xi(\psi) = \Sigma_{i=0}^n [bp_i K_{i,n}(\psi^i (1-\psi)^{n-i})] + \psi \Delta \xi,$$

where:
   n is a positive integer corresponding to (n+1) number of radial azimuthal constraints;
   i is an integer varying from 0 to n;

$$\psi = \frac{\phi}{\theta} \quad \text{and} \quad \xi = \frac{r}{\theta};$$

$\phi$ is the azimuthal angle;
   r is a radius of the internal surface of the nacelle relative to the longitudinal centre line at the given axial position;
   $\theta$ is a maximum value of the azimuthal angle, such that $0 \leq \phi \leq \theta$ and $0 \leq \psi \leq 1$;

$bp_i$ is an $i^{th}$ Bernstein polynomial coefficient, wherein the Bernstein polynomial coefficients are obtained by solving a set of (n+1) linear equations provided by the radial azimuthal constraints;

$$K_{i,n} = \frac{n!}{i!(n-1)}; \text{ and}$$

$$\Delta \xi = \xi_{\psi=1} - \xi_{\psi=0}.$$

2. The nacelle of claim 1, wherein each intake line at the respective value of the azimuthal angle is defined by the equation:

$$\mu(\lambda) = \Sigma_{i=0}^{m}[cp_i K_{i,m}(\lambda^i(1-\lambda)^{m-i})]\lambda^{1.0}(1-\lambda)^{0.5} + \lambda\Delta\mu,$$

where:
m is a positive integer corresponding to (m+1) number of intake constraints;
i is an integer varying from 0 to m;

$$\lambda = \frac{L}{L_{int}} \text{ and } \mu = \frac{x}{L_{int}};$$

$L_{int}$ is an axial length of the air intake relative to the longitudinal centre line;
L is an axial parameter of the intake line such that $0 \leq L \leq L_{int}$ and $0 \leq \psi \leq 1$;
x is a radius of the internal surface of the nacelle relative to the longitudinal centre line;
$cp_i$ is an $i^{th}$ Bernstein polynomial coefficient, wherein the Bernstein polynomial coefficients are obtained by solving a set of (m+1) linear equations provided by the intake constraints;

$$K_{i,m} = \frac{m!}{i!(m-1)}; \text{ and}$$

$$\Delta\mu = \mu_{\lambda=1} - \mu_{\lambda=0}.$$

3. The nacelle of claim 2, wherein the intake constraints for each intake line comprises at least one positional constraint, at least one gradient constraint, at least one second derivative constraint and at least one radius of curvature constraint.

4. The nacelle of claim 1, wherein the radial azimuthal constraints comprise at least one positional constraint, at least one gradient constraint, at least one second derivative constraint and at least one radius of curvature constraint.

5. The nacelle of claim 1, wherein an azimuthal variation of a parameter (y) of the nacelle at a given axial position along the longitudinal centre line is defined by the equation:

$$\omega(\psi) = \Sigma_{i=0}^{p}[dp_i K_{i,p}(\psi^i(1-\psi)^{p-i})] + \psi\Delta\omega,$$

where:
p is a positive integer corresponding to (p+1) number of parameter azimuthal constraints;
i is an integer varying from 0 to p;

$$\psi = \frac{\phi}{\theta} \text{ and } \omega = \frac{y}{\theta};$$

$\phi$ is the azimuthal angle;
$\theta$ is a maximum value of the azimuthal angle such that $0 \leq \phi \leq \theta$ and $0 \leq \psi \leq 1$;

y is the parameter of the nacelle;
$dp_i$ is an $i^{th}$ Bernstein polynomial coefficient, wherein the Bernstein polynomial coefficients are obtained by solving a set of (p+1) linear equations provided by the azimuthal constraints;

$$K_{i,p} = \frac{p!}{i!(p-1)}; \text{ and}$$

$$\Delta\omega = \omega_{\psi=1} - \omega_{\psi=0}.$$

6. The nacelle of claim 5, wherein the intake lip comprises a highlight at a leading edge of the nacelle, the highlight comprising a highlight radius, the throat comprising a throat radius, wherein a contraction ratio is defined as a ratio between the highlight radius and the throat radius, and wherein the contraction ratio is the parameter (y) of the nacelle.

7. The nacelle of claim 6, wherein the intake lip further comprises a lip length between the leading edge of the nacelle and the throat, wherein an aspect ratio is defined as a ratio of the lip length, and a difference between the highlight radius and the throat radius, and wherein the aspect ratio is the parameter (y) of the nacelle.

8. The nacelle of claim 7, wherein the intake lip further comprises a lip radius at the highlight of the nacelle, wherein a lip factor is defined as a ratio between a product of the lip radius and the lip length, and a square of a difference between the highlight radius and the throat radius, and wherein the lip factor is the parameter (y) of the nacelle.

9. A gas turbine engine for an aircraft, the gas turbine engine comprising the nacelle of claim 1.

10. A method of designing a nacelle for a gas turbine engine having a longitudinal centre line, the nacelle comprising an air intake, the method comprising the steps of:
determining a plurality of intake lines extending along an internal surface of the nacelle at respective values of an azimuthal angle, wherein the azimuthal angle is defined about the longitudinal centre line, and wherein each intake line axially defines the air intake along the longitudinal centre line at the respective value of the azimuthal angle; and
determining the internal surface between the plurality of intake lines at a given axial location along the longitudinal centre line by the equation:

$$\xi(\psi) = \Sigma_{i=0}^{n}[bp_i K_{i,n}(\psi^i(1-\psi)^{n-i})] + \psi\Delta\xi,$$

where:
n is a positive integer corresponding to (n+1) number of radial azimuthal constraints;
i is an integer varying from 0 to n;

$$\psi = \frac{\phi}{\theta} \text{ and } \xi = \frac{r}{\theta};$$

$\phi$ is the azimuthal angle;
r is a radius of the internal surface of the nacelle relative to the longitudinal centre line;
$\theta$ is a maximum value of the azimuthal angle, such that $0 \leq \phi \leq \theta$ and $0 \leq \psi \leq 1$;
$bp_i$ is an $i^{th}$ Bernstein polynomial coefficient, wherein the Bernstein polynomial coefficients are obtained by solving a set of (n+1) linear equations provided by the radial azimuthal constraints;

$$K_{i,n} = \frac{n!}{i!(n-1)}; \text{ and}$$

$$\Delta \xi = \xi_{\psi=1} - \xi_{\psi=0}.$$

11. The method of claim 10, wherein each intake line at the respective value of the azimuthal angle is determined by the equation:

$$\mu(\lambda) = \Sigma_{i=0}^{m}[cp_i K_{i,m}(\lambda^i(1-\lambda)^{m-i})]\lambda^{1.0}(1-\lambda)^{0.5} + \lambda\Delta\mu,$$

where:
m is a positive integer corresponding to (m+1) number of intake constraints;
i is an integer varying from 0 to m;

$$\lambda = \frac{L}{L_{int}} \text{ and } \mu = \frac{x}{L_{int}};$$

$L_{int}$ is an axial length of the air intake relative to the longitudinal centre line;
L is an axial parameter of the intake line such that $0 \leq L \leq L_{int}$ and $0 \leq \psi \leq 1$;
x is a radius of the internal surface of the nacelle relative to the longitudinal centre line;
$cp_i$ is an $i^{th}$ Bernstein polynomial coefficient, wherein the Bernstein polynomial coefficients are obtained by solving a set of (m+1) linear equations provided by the intake constraints;

$$K_{i,m} = \frac{m!}{i!(m-1)}; \text{ and}$$

$$\Delta\mu = \mu_{\lambda=1} - \mu_{\lambda=0}.$$

12. The method of claim 11, wherein the intake constraints for each intake line comprises at least one positional constraint, at least one gradient constraint, at least one second derivative constraint and at least one radius of curvature constraint.

13. The method of claim 10, wherein the radial azimuthal constraints comprise at least one positional constraint, at least one gradient constraint, at least one second derivative constraint and at least one radius of curvature constraint.

14. The method of claim 10, further comprising determining an azimuthal variation of a parameter (y) of the nacelle at a given axial position along the longitudinal centre line by the equation:

$$\omega(\psi) = \Sigma_{i=0}^{p}[dp_i K_{i,p}(\psi^i(1-\psi)^{p-i})] + \psi\Delta\omega,$$

where: p is a positive integer corresponding to (p+1) number of parameter azimuthal constraints;
i is an integer varying from 0 to p;

$$\psi = \frac{\phi}{\theta} \text{ and } \omega = \frac{y}{\theta};$$

$\phi$ is the azimuthal angle;
$\theta$ is a maximum value of the azimuthal angle such that $0 \leq \phi \leq \theta$ and $0 \leq \psi \leq 1$;
y is the parameter of the nacelle;
$dp_i$ is an $i^{th}$ Bernstein polynomial coefficient, wherein the Bernstein polynomial coefficients are obtained by solving a set of (p+1) linear equations provided by the azimuthal constraints;

$$K_{i,p} = \frac{p!}{i!(p-1)}; \text{ and}$$

$$\Delta\omega = \omega_{\psi=1} - \omega_{\psi=0}.$$

* * * * *